United States Patent
Yamamoto

(10) Patent No.: US 10,254,520 B2
(45) Date of Patent: Apr. 9, 2019

(54) VARIABLE POWER OPTICAL SYSTEM, OPTICAL DEVICE, AND MANUFACTURING METHOD FOR VARIABLE POWER OPTICAL SYSTEM

(71) Applicant: Nikon Corporation, Minato-ku, Tokyo (JP)

(72) Inventor: Hiroshi Yamamoto, Kawasaki (JP)

(73) Assignee: Nikon Corporation, Tokyo (JP)

( * ) Notice: Subject to any disclaimer, the term of this patent is extended or adjusted under 35 U.S.C. 154(b) by 64 days.

(21) Appl. No.: 15/418,777

(22) Filed: Jan. 29, 2017

(65) Prior Publication Data
US 2017/0192212 A1 Jul. 6, 2017

Related U.S. Application Data

(63) Continuation of application No. PCT/JP2015/071583, filed on Jul. 30, 2015.

(30) Foreign Application Priority Data

Jul. 30, 2014 (JP) .................................. 2014-154845
Jul. 30, 2014 (JP) .................................. 2014-154846

(51) Int. Cl.
*G02B 15/14* (2006.01)
*G02B 15/20* (2006.01)
(Continued)

(52) U.S. Cl.
CPC .............. *G02B 15/20* (2013.01); *G02B 15/17* (2013.01); *G02B 27/646* (2013.01); *G02B 5/005* (2013.01);
(Continued)

(58) Field of Classification Search
CPC .............. G02B 27/646; G02B 27/0025; G02B 13/004; G02B 15/20; G02B 13/009;
(Continued)

(56) References Cited

U.S. PATENT DOCUMENTS 5,517,361 A 5/1996 Inadome et al.
5,666,229 A 9/1997 Ohtake
(Continued)

FOREIGN PATENT DOCUMENTS

EP 0 601 337 A2 6/1994
JP 63-195618 A 8/1988
(Continued)

OTHER PUBLICATIONS

Extended European Search Report dated Feb. 22, 2018, in European Patent Application No. 15826707.0.
(Continued)

*Primary Examiner* — Evelyn A Lester
(74) *Attorney, Agent, or Firm* — Shapiro, Gabor and Rosenberger, PLLC

(57) ABSTRACT

A variable magnification optical system of the present application comprises a first lens group (G1) disposed at a most object side, a first focusing lens group (Ga) disposed at an image side of the first lens group, a second focusing lens group (Gb) disposed at an image side of the first focusing lens group, and a rear lens group (Gr) disposed at an image side of the second focusing lens group; upon varying magnification, the first lens group being moved, and an interval between the first lens group and the first focusing lens group, an interval between the first focusing lens group and the second focusing lens group, and an interval between the second focusing lens group and the rear lens group being varied; upon focusing, the first focusing lens group and the second focusing lens group being moved along the optical axis with different trajectories from each other; and a given conditional expression being satisfied.

35 Claims, 23 Drawing Sheets

(51) Int. Cl.
| | |
|---|---|
| *G02B 15/17* | (2006.01) |
| *G02B 27/64* | (2006.01) |
| *G02B 13/00* | (2006.01) |
| *G02B 27/00* | (2006.01) |
| *G02B 15/163* | (2006.01) |
| *G02B 5/00* | (2006.01) |
| *G02B 9/34* | (2006.01) |
| *G02B 13/18* | (2006.01) |
| *G02B 15/173* | (2006.01) |

(52) U.S. Cl.
CPC .............. *G02B 9/34* (2013.01); *G02B 13/002* (2013.01); *G02B 13/004* (2013.01); *G02B 13/009* (2013.01); *G02B 13/18* (2013.01); *G02B 15/14* (2013.01); *G02B 15/163* (2013.01); *G02B 15/173* (2013.01); *G02B 27/0025* (2013.01)

(58) Field of Classification Search
CPC .......... G02B 9/34; G02B 13/18; G02B 15/14; G02B 15/163; G02B 5/005; G02B 13/002
USPC ................ 359/557, 683–688, 715–717, 740, 359/771–776
See application file for complete search history.

(56) References Cited

U.S. PATENT DOCUMENTS

| | | | | |
|---|---|---|---|---|
| 8,611,016 | B2 * | 12/2013 | Imaoka | ................ G02B 27/646 359/557 |
| 2005/0041305 | A1 | 2/2005 | Ishii | |
| 2010/0284092 | A1 | 11/2010 | Hayakawa | |
| 2013/0050843 | A1 | 2/2013 | Nakamura | |
| 2013/0120640 | A1 | 5/2013 | Taki | |
| 2013/0215294 | A1 | 8/2013 | Nishio et al. | |
| 2014/0139722 | A1 | 5/2014 | Sugita | |
| 2015/0168697 | A1 | 6/2015 | Ogata | |
| 2015/0241672 | A1 | 8/2015 | Masugi | |

FOREIGN PATENT DOCUMENTS

| | | |
|---|---|---|
| JP | 06-175023 A | 6/1994 |
| JP | 07-306363 A | 11/1995 |
| JP | 08-043734 A | 2/1996 |
| JP | 2010-026407 A | 2/2010 |
| JP | 2012-133116 A | 7/2012 |
| JP | 2013-044815 A | 3/2013 |
| JP | 2013-109013 A | 6/2013 |
| JP | 2013-182017 A | 9/2013 |
| JP | 2013-200543 A | 10/2013 |
| JP | 2014-026074 A | 2/2014 |
| JP | 2014-102462 A | 6/2014 |
| JP | 2015-118127 A | 6/2015 |

OTHER PUBLICATIONS

International Preliminary Report on Patentability from International Patent Application No. PCT/JP2015/071583, dated Feb. 9, 2017.
International Search Report from International Patent Application No. PCT/JP2015/071583, dated Oct. 27, 2015.
Office Action dated Oct. 23, 2018, in Japanese Patent Application No. 2016-538418.

* cited by examiner

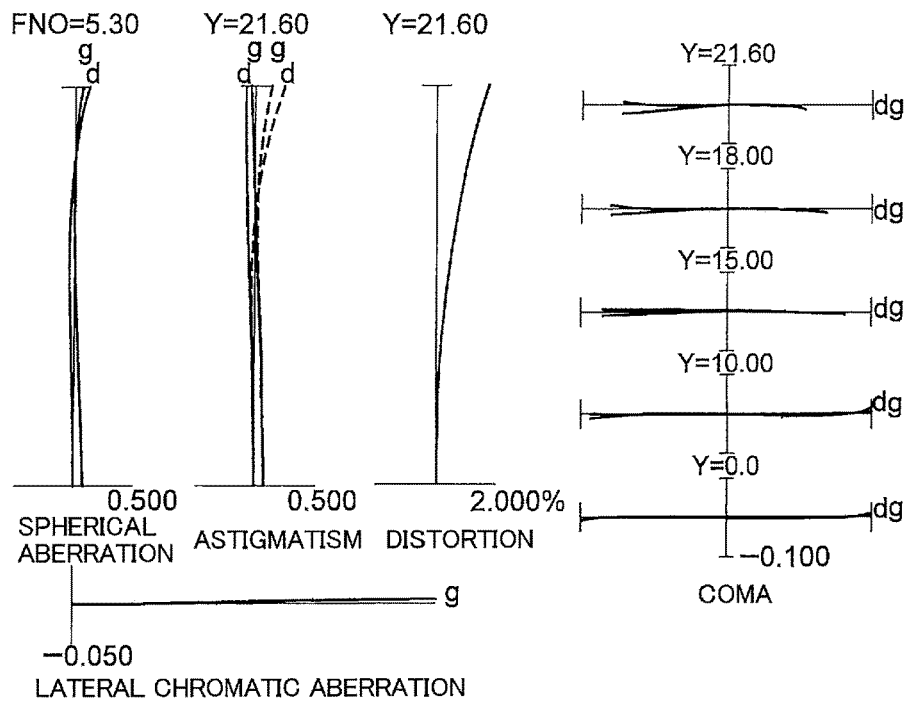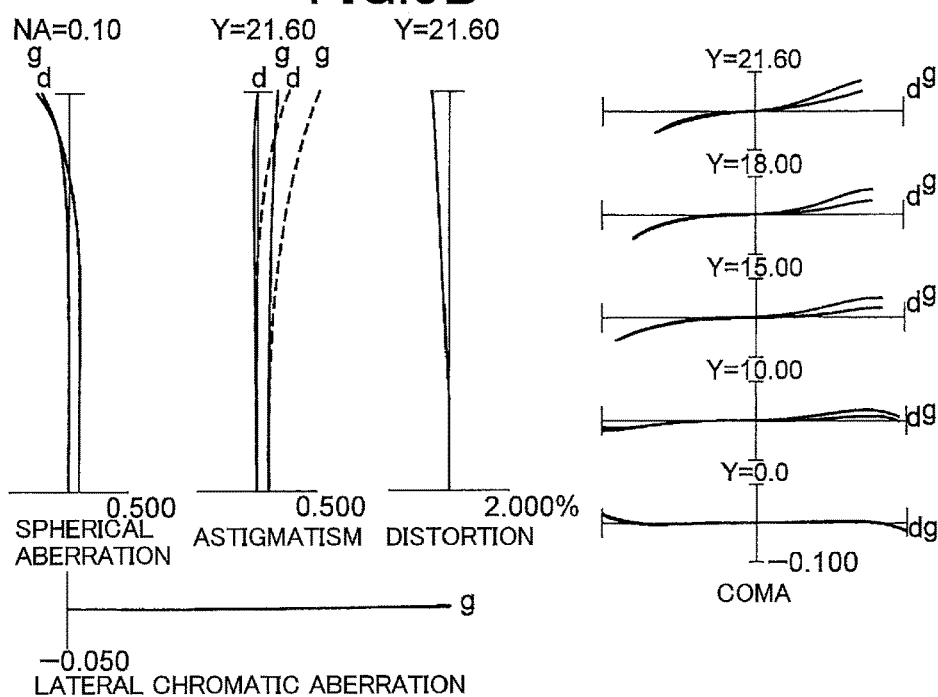

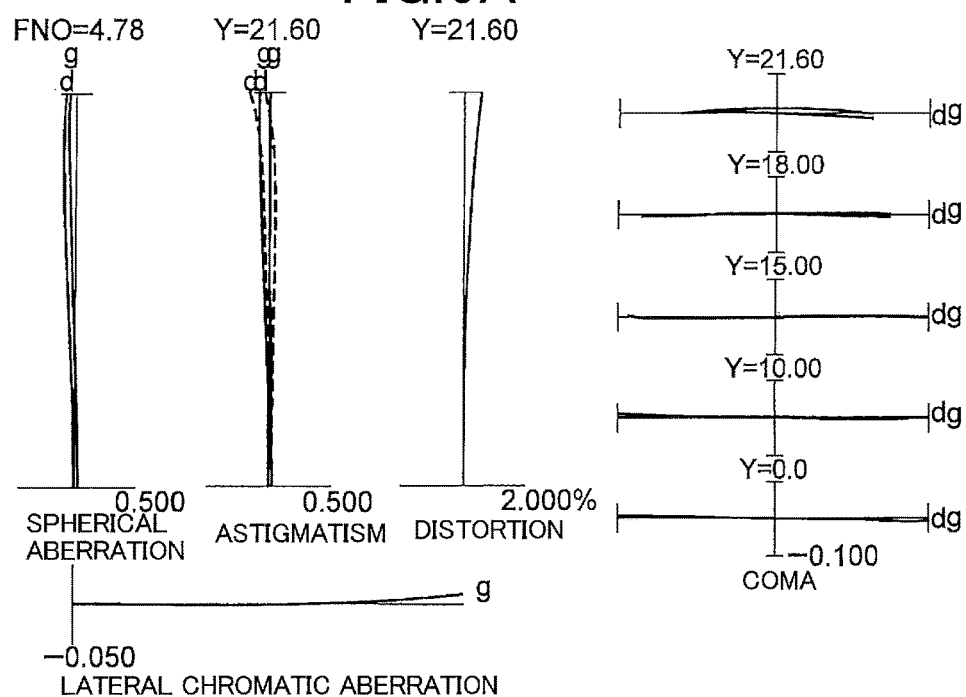
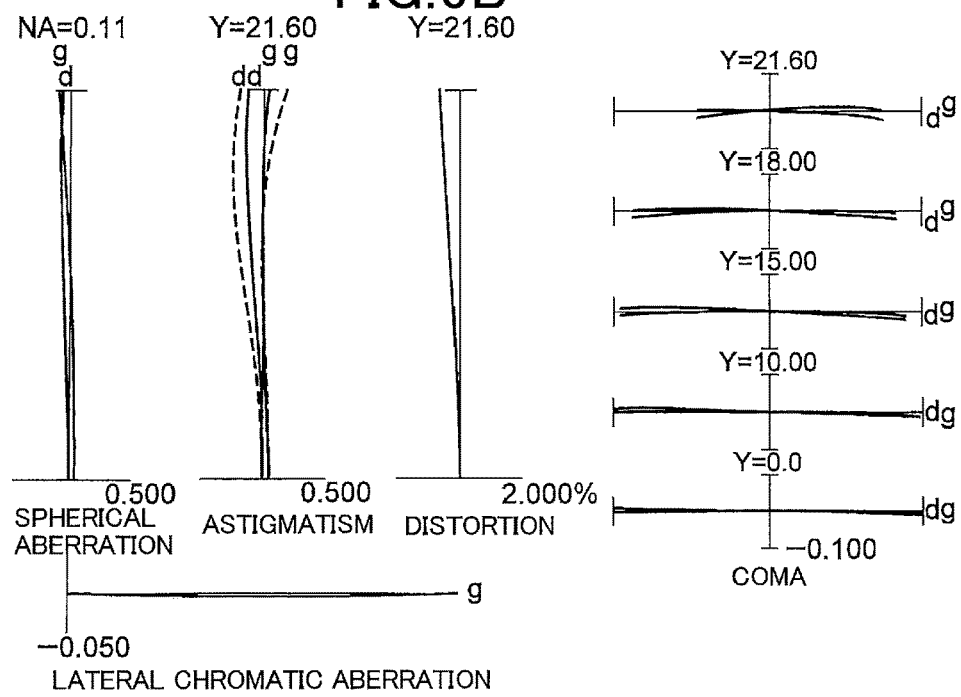

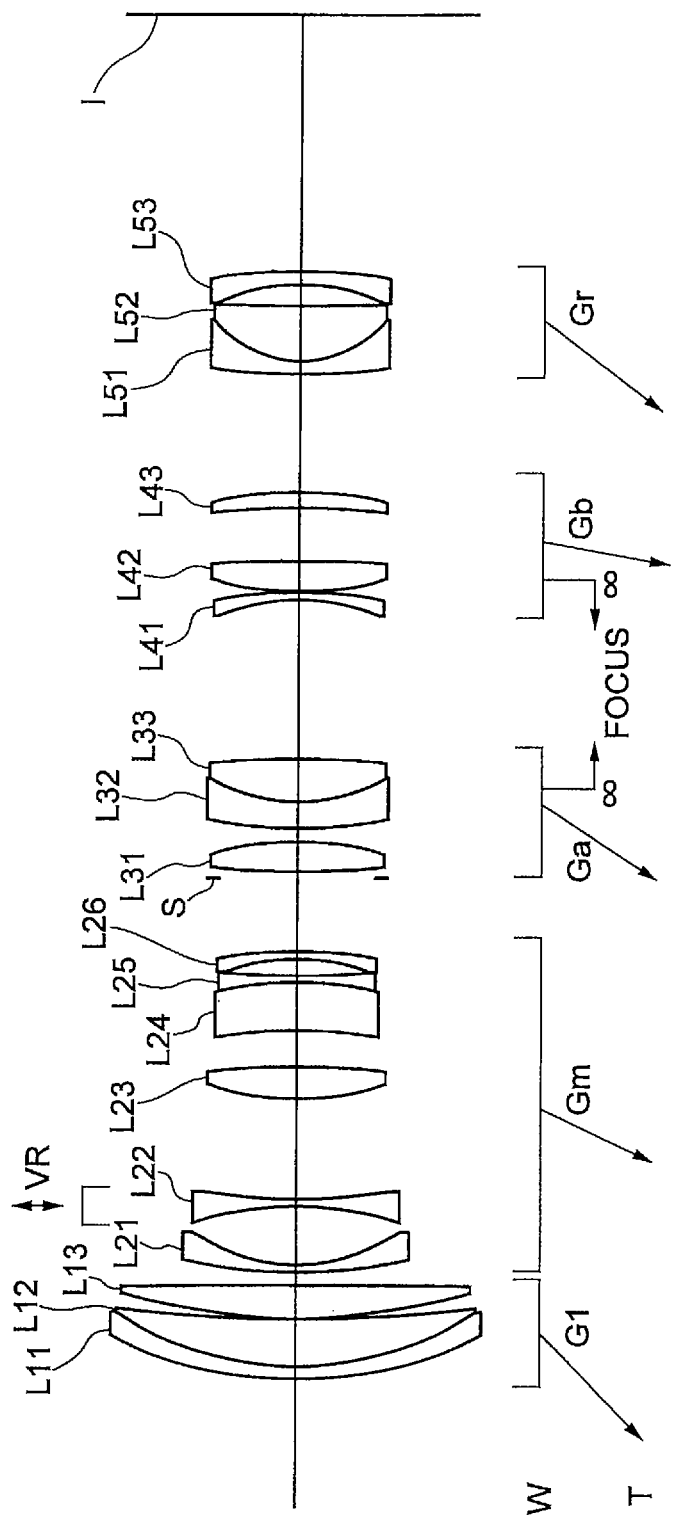

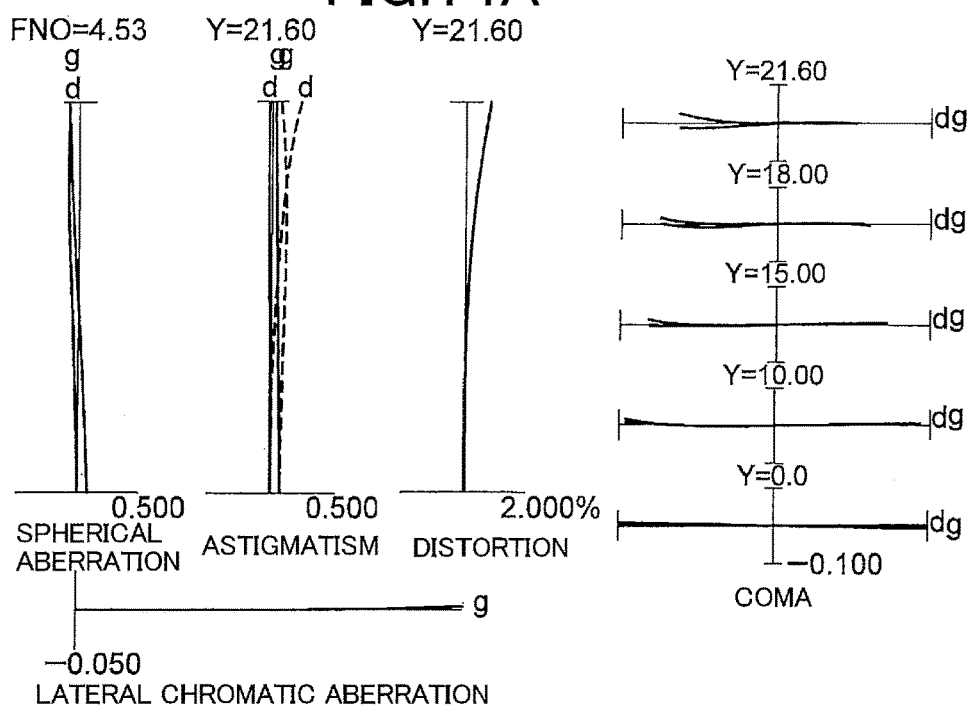
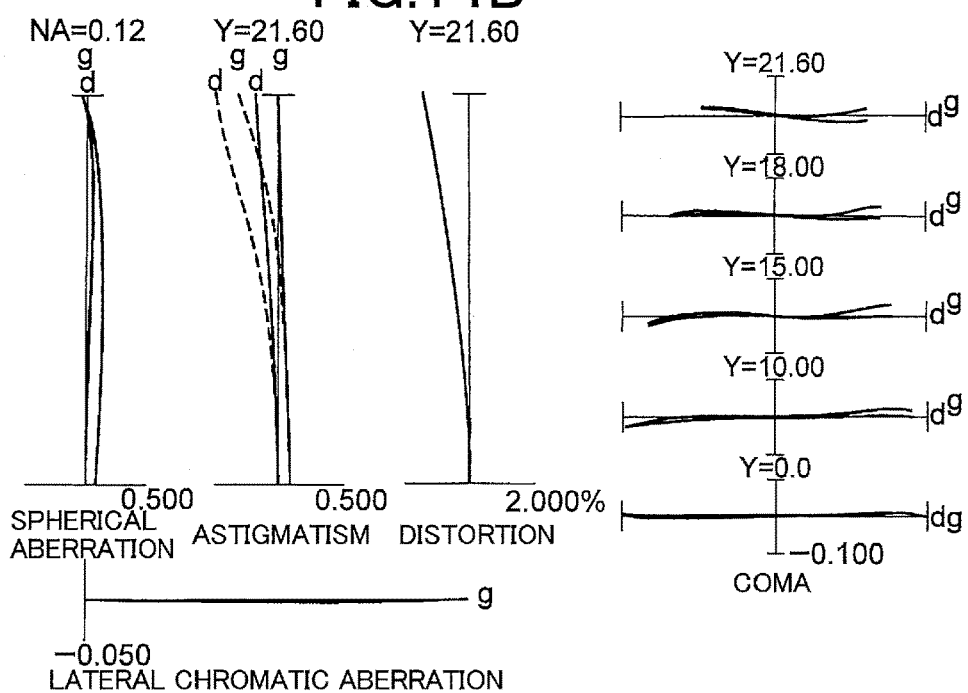

VARIABLE POWER OPTICAL SYSTEM, OPTICAL DEVICE, AND MANUFACTURING METHOD FOR VARIABLE POWER OPTICAL SYSTEM

TECHNICAL FIELD

The present invention relates to a variable magnification optical system, an optical apparatus and a method for manufacturing the variable magnification optical system.

BACKGROUND ART

There has been proposed a variable magnification optical system that is suitable to be used for a photographic camera, an electronic still camera, a video camera and the like. For example, there is a Patent Document 1 as below mentioned. However, there has been a problem that it is difficult for the conventional variable magnification optical system to attain high optical performance.

PRIOR ART REFERENCE

Patent Document

Patent Document 1: Japanese Patent application Laid-Open Gazette No. 2013-109013.

SUMMARY OF THE INVENTION

According to a first aspect of the present application, there is provided a variable magnification optical system comprising:
a first lens group disposed at a most object side,
a first focusing lens group disposed at an image side of the first lens group,
a second focusing lens group disposed at an image side of the first focusing lens group, and
a rear lens group disposed at an image side of the second focusing lens group;
upon varying magnification, the first lens group being moved, and an interval between said first lens group and said first focusing lens group, an interval between said first focusing lens group and said second focusing lens group, and an interval between said second focusing lens group and said rear lens group being varied;
upon focusing, said first focusing lens group and said second focusing lens group being moved along the optical axis with different trajectories from each other; and
the following conditional expression being satisfied:

$$0.30<|fa/fb|<0.90$$

where fa denotes a focal length of said first focusing lens group, and fb denotes a focal length of said second focusing lens group.

According to a second aspect of the present application, there is provided a variable magnification optical system comprising:
a first lens group disposed at a most object side,
a first focusing lens group disposed at an image side of the first lens group,
a second focusing lens group disposed at an image side of the first focusing lens group, and
a rear lens group disposed at an image side of the second focusing lens group;
upon varying magnification, the first lens group being moved, and an interval between said first lens group and said first focusing lens group, an interval between said first focusing lens group and said second focusing lens group, and an interval between said second focusing lens group and said rear lens group being varied;
upon focusing, said first focusing lens group and said second focusing lens group being moved along the optical axis with different trajectories from each other; and
the following conditional expressions being satisfied:

$$0.15<|fa|/f1<0.65$$

$$0.15<|fb|/f1<2.50$$

where fa denotes a focal length of said first focusing lens group, fb denotes a focal length of said second focusing lens group, and f1 denotes a focal length of said first lens group.

According to a third aspect of the present application, there is provided an optical apparatus equipped with the variable magnification optical system according to said first or said second aspect of the present application.

Further, according to a fourth aspect of the present application, there is provided a method for manufacturing a variable magnification optical system comprising: a first lens group disposed at a most object side, a first focusing lens group disposed at an image side of the first lens group, a second focusing lens group disposed at an image side of the first focusing lens group, and a rear lens group disposed at an image side of the second focusing lens group;
the method comprising the steps of:
constructing such that, upon varying magnification, the first lens group being moved, and an interval between said first lens group and said first focusing lens group, an interval between said first focusing lens group and said second focusing lens group and an interval between said second focusing lens group and said rear lens group are varied;
constructing such that, upon focusing, said first focusing lens group and said second focusing lens group are moved along the optical axis with different trajectories from each other; and
constructing such that, the following conditional expression is satisfied:

$$0.30<|fa/fb|<0.90$$

where fa denotes a focal length of said first focusing lens group, and fb denotes a focal length of said second focusing lens group.

Further, according to a fifth aspect of the present application, there is provided a method for manufacturing a variable magnification optical system comprising, in order from an object side: a first lens group having positive refractive power, an intermediate lens group having negative refractive power, a first focusing lens group having positive refractive power, a second focusing lens group having positive refractive power and a rear lens group having negative refractive power;
the method comprising the steps of:
constructing such that, upon varying magnification from a wide angle end state to a telephoto end state, the first lens group is moved, and an interval between said first lens group and said intermediate lens group, an interval between said intermediate lens group and said first focusing lens group, an interval between said first focusing lens group and said second focusing lens group and an interval between said second focusing lens group and said rear lens group are varied;
constructing such that, upon focusing from an infinite distance object to a close distance object, said first focusing lens group and said second focusing lens group are moved along the optical axis with different trajectories from each other; and constructing such that, the following conditional expressions are satisfied:

$$0.15<|fa|/f1<0.65$$

$$0.15<|fb|/f1<2.50$$

where fa denotes a focal length of said first focusing lens group, fb denotes a focal length of said second focusing lens group, and f1 denotes a focal length of said first lens group.

BRIEF DESCRIPTION OF THE DRAWINGS

FIGS. 2A and 2B are graphs showing various aberrations in the wide-angle end state of the variable magnification optical system according to the First Example, in which FIG. 2A shows various aberrations upon focusing on an infinity, and FIG. 2B shows various aberrations upon focusing on a close distance object.

FIGS. 3A and 3B are graphs showing various aberrations in an intermediate focal length state of the variable magnification optical system according to the First Example, in which FIG. 3A shows various aberrations upon focusing on an infinity, and FIG. 3B shows various aberrations upon focusing on a close distance object.

FIGS. 4A and 4B are graphs showing various aberrations in a telephoto end state of the variable magnification optical system according to the First Example, in which FIG. 4A shows various aberrations upon focusing on an infinity, and FIG. 4B shows various aberrations upon focusing on a close distance object.

FIGS. 6A and 6B are graphs showing various aberrations in a wide-angle end state of the variable magnification optical system according to the Second Example, in which FIG. 6A shows various aberrations upon focusing on an infinity, and FIG. 6B shows various aberration upon focusing on a close distance object.

FIGS. 7A and 7B are graphs showing various aberrations in an intermediate focal length state of the variable magnification optical system according to the Second Example, in which FIG. 7A shows various aberrations upon focusing on an infinity, and FIG. 7B shows various aberrations upon focusing on a close distance object.

FIGS. 8A and 8B are graphs showing various aberrations in a telephoto end state of the variable magnification optical system according to the Second Example, in which FIG. 8A shows various aberrations upon focusing on an infinity, and FIG. 8B shows aberration upon focusing on a close distance object.

FIGS. 10A and 10B are graphs showing various aberrations in a wide-angle end state of the variable magnification optical system according to the Third Example, in which FIG. 10A shows various aberrations upon focusing on an infinity, and FIG. 10B shows various aberrations upon focusing on a close distance object.

FIGS. 11A and 11B are graphs showing various aberrations in an intermediate focal length state of the variable magnification optical system according to the Third Example, in which FIG. 11A shows various aberrations upon focusing on an infinity, and FIG. 11B shows various aberrations upon focusing on a close distance object.

FIGS. 12A and 12B are graphs showing various aberrations in a telephoto end state of the variable magnification optical system according to the Third Example, in which FIG. 12A shows various aberrations upon focusing on an infinity, and FIG. 12B shows various aberrations upon focusing on a close distance object.

FIG. 13 is a sectional view showing a lens configuration of a variable magnification optical system according to a Fourth Example that is common to the first embodiment and the second embodiment of the present application.

FIGS. 14A and 14B are graphs showing various aberrations in a wide-angle end state of the variable magnification optical system according to the Fourth Example, in which FIG. 14A shows various aberrations upon focusing on an infinity, and FIG. 14B shows various aberrations upon focusing on a close distance object.

FIGS. 15A and 15B are graphs showing various aberrations in an intermediate focal length state of the variable magnification optical system according to the Fourth Example, in which FIG. 15A shows various aberrations upon focusing on an infinity, and FIG. 15B shows various aberrations upon focusing on a close distance object.

FIGS. 16A and 16B are graphs showing various aberrations in a telephoto end state of the variable magnification optical system according to the Fourth Example, in which FIG. 16A shows various aberrations upon focusing on an infinity, and FIG. 16B shows various aberrations upon focusing on a close distance object.

FIGS. 18A and 18B are graphs showing various aberrations in a wide-angle end state of the variable magnification optical system according to the Fifth Example, in which FIG. 18A shows various aberrations upon focusing on an infinity, and FIG. 18B shows various aberrations upon focusing on a close distance object.

FIGS. 19A and 19B are graphs showing various aberrations in an intermediate focal length state of the variable magnification optical system according to the Fifth Example, in which FIG. 19A shows various aberrations upon focusing on an infinity, and FIG. 19B shows various aberrations upon focusing on a close distance object.

FIGS. 20A and 20B are graphs showing various aberrations in a telephoto end state of the variable magnification optical system according to the Fifth Example, in which FIG. 20A shows various aberrations upon focusing on an infinity, and FIG. 20B shows various aberrations upon focusing on a close distance object.

EMBODIMENTS FOR CARRYING OUT THE INVENTION

Figure 1:
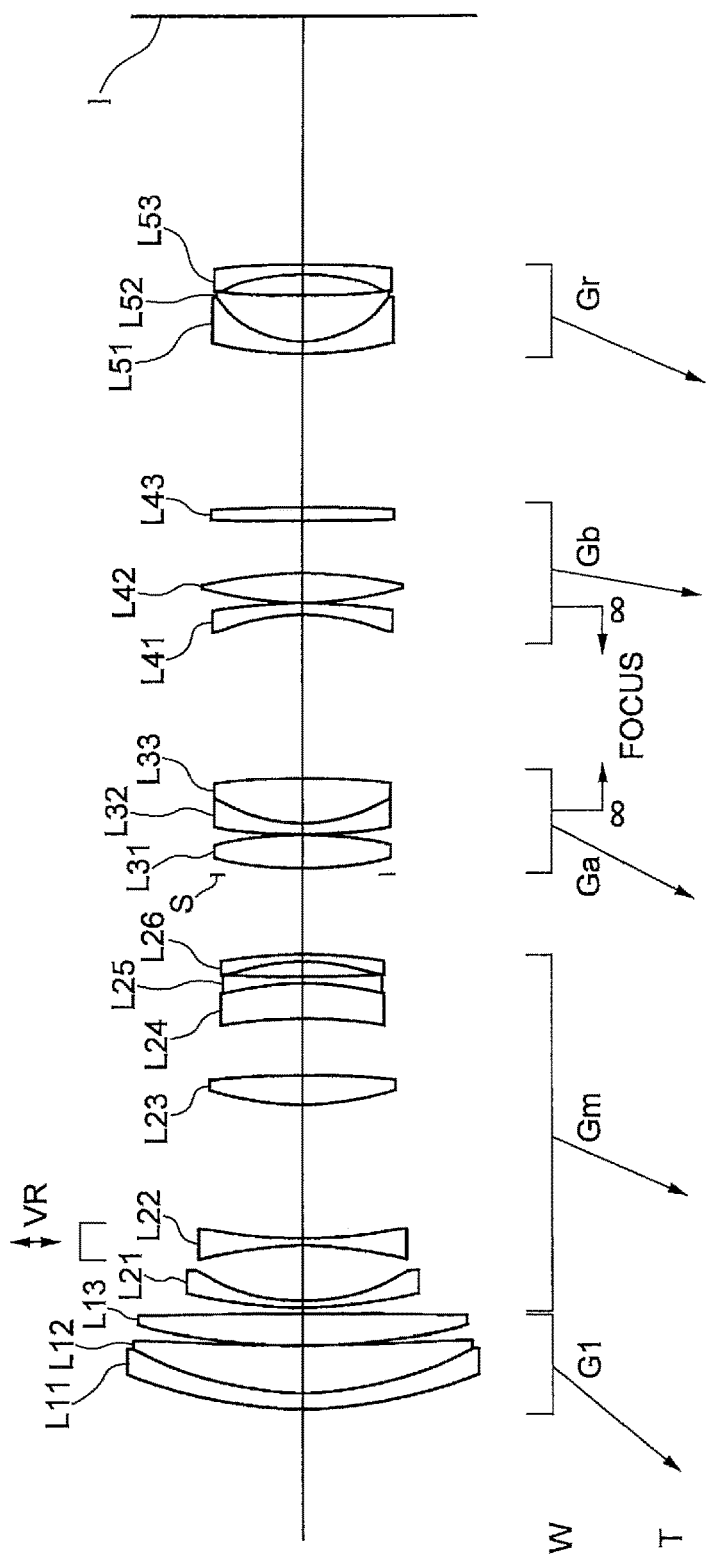
FIG. 1 is a sectional view showing a lens configuration of a variable magnification optical system according to a First Example that is common to a first embodiment and a second embodiment of the present application.

Next, a variable magnification optical system according to the first embodiment and the second embodiment of the present application, an optical apparatus and a method for producing the variable magnification optical system, will be explained with reference to the accompanying drawings. Meanwhile, the embodiments explained below are for easily understanding the invention and are not intended to exclude any addition, replacement or the like which can be applicable by those skillful in the art within the scope from which the technical idea of the invention of the present application is not departed.

(First Embodiment)

The variable magnification optical system according to the first embodiment of the present application, comprises, in order from an object side: a first lens group having positive refractive power, an intermediate lens group having negative refractive power, a first focusing lens group having positive refractive power, a second focusing lens group having positive refractive power and a rear lens group having negative refractive power, wherein upon varying magnification from a wide angle end state to a telephoto end state, the first lens group is moved, and an interval between said first lens group and said intermediate lens group, an interval between said intermediate lens group and said first focusing lens group, an interval between said first focusing lens group and said second focusing lens group and an interval between said second focusing lens group and said rear lens group are varied.

With taking such a configuration, it becomes easy to secure variable magnification ratio, and moreover variations in aberrations caused by varying magnification can be corrected excellently. Meanwhile, in the first aspect of the present application, at least one intermediate lens group having negative refractive power may be disposed between the first lens group and the first focusing lens group, like the embodiments of the present application. Further, in the first aspect of the present application, at least one of the first focusing lens group and the second focusing lens group may have positive refractive power and the rear lens group may have negative refractive power. Furthermore, in the first aspect of the present application, a lens arranged at most object side among lenses contained in the first focusing lens group may be arranged at an image side of an aperture stop. Furthermore, in the first aspect of the present application, the first focusing lens group may be moved toward the image side and the second focusing lens group may be moved toward the object side, upon focusing on from an infinite distance object to a close distance object.

In the variable magnification optical system according to the first embodiment of the present application, upon focusing on from an infinite distance object to a close distance object, said first focusing lens group and said second focusing lens group are moved along the optical axis with differing trajectories from each other.

With such configuration, it is possible to correct superbly variation in aberrations caused by focusing.

Further, the present variable magnification optical system satisfies the following conditional expression (1-1):

$$0.30 < |fa/fb| < 0.90 \quad (1\text{-}1)$$

where fa denotes a focal length of said first focusing lens group, and fb denotes a focal length of said second focusing lens group.

The conditional expression (1-1) defines a ratio of the focal length of the first focusing lens group relative to the focal length of the second focusing lens group. By satisfying the conditional expression (1-1), it is possible to correct superbly variation in aberrations caused by focusing.

When the value of |fa/fb| is equal to or falls below the lower limit of the conditional expression (1-1), refractive power of the first focusing lens group becomes large, and it becomes difficult to correct spherical aberration and coma aberration upon focusing on a close distance. This is not preferable. Meanwhile, in order to ensure the advantageous effect of the present embodiment more surely, it is preferable to set the lower limit value of the conditional expression (1-1) to 0.33.

When the value of |fa/fb| is equal to or exceeds the upper limit of the conditional expression (1-1), refractive power of the second focusing group becomes large, and it becomes difficult to correct spherical aberration and coma aberration upon focusing on a close distance. This is not preferable. Meanwhile, in order to ensure the advantageous effect of the present embodiment more surely, it is preferable to set the upper limit value of the conditional expression (1-1) to 0.85.

By the above described configuration, it is possible to realize the variable magnification optical system which can suppress variation in aberrations caused by varying magnification and has a high optical performance.

Further, in the present variable magnification optical system, it is desirable that at least a portion of the intermediate lens group is so moved to include a component in a direction perpendicular to the optical axis.

With this configuration, it is possible to reduce variation in optical performance upon conducting vibration reduction and to make the vibration reduction unit compact.

Further, in the present variable magnification optical system, it is desirable that the following conditional expressions (1-2) is satisfied:

$$0.15 < |fa|/f1 < 0.65 \quad (1\text{-}2)$$

where fa denotes a focal length of said first focusing lens group and f1 denotes a focal length of said first lens group.

The conditional expression (1-2) defines a ratio of the focal length of the first focusing lens group relative to the focal length of the first lens group. By satisfying the conditional expression (1-2), it is possible to correct superbly spherical aberration and curvature of field.

When the value of |fa|/f1 is equal to or falls below the lower limit of the conditional expression (1-2), refractive power of the first focusing lens group becomes large, and it becomes difficult to correct spherical aberration and coma aberration. Meanwhile, in order to ensure the advantageous effect of the present embodiment, it is preferable to set the lower limit value of the conditional expression (1-2) to 0.23.

When the value of |fa|/f1 is equal to or exceeds the upper limit of the conditional expression (1-2), refractive power of the first lens group becomes large, and it becomes difficult to correct spherical aberration and curvature of field. Meanwhile, it is possible to ensure the advantageous effect of the present embodiment more surely, if the upper limit value of the conditional expression (1-2) is set to 0.55.

Further, in the present variable magnification optical system, it is desirable that the following conditional expressions (1-3) is satisfied:

$$0.20 < |fa|/(-fr) < 1.00 \quad (1\text{-}3)$$

where fa denotes a focal length of the first focusing lens group and fr denotes a focal length of the rear lens group.

The conditional expression (1-3) defines a ratio of the focal length of the first focusing lens group relative to the focal length of the rear lens group. By satisfying the conditional expression (1-3), it is possible to correct superbly spherical aberration and curvature of field.

When the value of |fa|/(−fr) is equal to or falls below the lower limit of the conditional expression (1-3), refractive power of the first focusing lens group becomes large, and it becomes difficult to correct spherical aberration and coma aberration. This is not preferable. Meanwhile, in order to ensure the advantageous effect of the present embodiment more surely, it is preferable to set the lower limit value of the conditional expression (1-3) to 0.35.

When the value of |fa|/(−fr) is equal to or exceeds the upper limit of the conditional expression (1-3), refractive power of the rear lens group becomes large, and it becomes difficult to correct spherical aberration and curvature of field. This is not preferable. Meanwhile, in order to ensure the advantageous effect of the present embodiment more surely, it is preferable to set the upper limit value of the conditional expression (1-3) to 0.92.

Further, in the present variable magnification optical system, it is desirable that said first focusing lens group consists of two positive lenses and one negative lens.

With this configuration, it is possible to reduce variation in optical performance upon focusing and to make the focusing unit compact.

Further, in the present variable magnification optical system, it is desirable that the following conditional expression (1-4) is satisfied:

$$0.50 < Xat/D3a < 3.00 \qquad (1\text{-}4)$$

where Xat denotes a distance which said first focusing lens group moves upon focusing from an infinite distance object to a close distance object in a telephoto end state and D3a denotes a distance from a most object side lens surface of the first focusing lens group to a most image side lens surface of the first focusing lens group.

The conditional expression (1-4) defines a ratio of an amount of movement of the first focusing lens group for focusing at a telephoto end relative to the entire thickness of the first focusing lens group. By satisfying the conditional expression (1-4), both of a high optical performance at the time of a close distance focusing and making a lens barrel compact can be attained.

When the value of Xat/D3a is equal to or falls below the lower limit of the conditional expression (1-4) of the present variable magnification optical system according to the present first embodiment, an amount of movement of the first focusing lens group for focusing decreases, Accordingly, refractive power of the first focusing lens group has to be strengthened in order to focus on a desired close distance, so it becomes difficult to correct spherical aberration and curvature of field. It is not desirable. Meanwhile, in order to ensure the advantageous effect of the present embodiment, it is preferable to set the lower limit value of the conditional expression (1-4) to 0.70.

When the value of Xat/D3a is equal to or exceeds the upper limit of the conditional expression (1-4), an amount of movement of the first focusing lens group for focusing becomes large and the lens barrel also becomes large in size. It is not desirable. Meanwhile, it is possible to ensure the advantageous effect of the present embodiment more surely, if the upper limit value of the conditional expression (1-4) is set to 2.20.

An optical apparatus according to the present embodiment comprises the variable magnification optical system having the above described configuration. With this configuration, it is possible to realize an optical apparatus which can suppress variation in aberrations caused by varying magnification and has a high optical performance.

A method for manufacturing the variable magnification optical system according to the present first embodiment, is a method for manufacturing a variable magnification optical system which comprises, in order from an object side: a first lens group having positive refractive power, an intermediate lens group having negative refractive power, a first focusing lens group having positive refractive power, a second focusing lens group having positive refractive power and a rear lens group having negative refractive power, the method comprising the steps of:

constructing such that, upon varying magnification from a wide angle end state to a telephoto end state, the first lens group is moved, and an interval between said first lens group and said intermediate lens group, an interval between said intermediate lens group and said first focusing lens group, an interval between said first focusing lens group and said second focusing lens group and an interval between said second focusing lens group and said rear lens group are varied;

constructing such that, upon focusing on from an infinite distance object to a close distance object, said first focusing lens group and said second focusing lens group are moved along the optical axis with differing trajectories from each other; and constructing such that the following conditional expression (1-1):

$$0.30 < |fa/fb| < 0.90 \qquad (1\text{-}1)$$

where fa denotes a focal length of said first focusing lens group, and fb denotes a focal length of said second focusing lens group.

According to this method, it is possible to manufacture a variable magnification optical system which can suppress variation in aberrations and has a high optical performance.

(Second Embodiment)

The variable magnification optical system according to the second embodiment of the present application, comprises, in order from an object side: a first lens group having positive refractive power, an intermediate lens group having negative refractive power, a first focusing lens group having positive refractive power, a second focusing lens group having positive refractive power and a rear lens group having negative refractive power, wherein upon varying magnification from a wide angle end state to a telephoto end state, the first lens group is moved, and an interval between said first lens group and said intermediate lens group, an interval between said intermediate lens group and said first focusing lens group, an interval between said first focusing lens group and said second focusing lens group and an interval between said second focusing lens group and said rear lens group are varied.

With taking such a configuration, it becomes easy to secure variable magnification ratio, and moreover variations in aberrations caused by varying magnification can be corrected excellently. Meanwhile, in the second aspect of the present application, at least one intermediate lens group having negative refractive power may be disposed between the first lens group and the first focusing lens group, like the embodiments of the present application. Further, in the second aspect of the present application, at least one of the first focusing lens group and the second focusing lens group may have positive refractive power and the rear lens group may have negative refractive power. Furthermore, in the second aspect of the present application, a lens arranged at most object side among lenses contained in the first focusing lens group may be arranged at an image side of an aperture stop. Furthermore, in the second aspect of the present application, the first focusing lens group may be moved toward the image side and the second focusing lens group may be moved toward the object side, upon focusing on from an infinite distance object to a close distance object.

In the variable magnification optical system according to the second embodiment of the present application, upon focusing on from an infinite distance object to a close distance object, said first focusing lens group and said second focusing lens group are moved along the optical axis with differing trajectories from each other.

With such configuration, it is possible to correct superbly variation in aberrations caused by focusing.

Further, in the present variable magnification optical system, the following conditional expressions (2-1) is satisfied:

$$0.15 < |fa|/f1 < 0.65 \quad (2\text{-}1)$$

where fa denotes a focal length of said first focusing lens group and f1 denotes a focal length of said first lens group.

The conditional expression (2-1) defines a ratio of the focal length of the first focusing lens group relative to the focal length of the first lens group. By satisfying the conditional expression (2-1), it is possible to correct superbly spherical aberration and curvature of field.

When the value of |fa|/f1 is equal to or falls below the lower limit of the conditional expression (2-1), refractive power of the first focusing lens group becomes large, and it becomes difficult to correct spherical aberration and coma aberration. It is not desirable. Meanwhile, in order to ensure the advantageous effect of the present embodiment, it is preferable to set the lower limit value of the conditional expression (2-1) to 0.23.

When the value of |fa|/f1 is equal to or exceeds the upper limit of the conditional expression (2-1), refractive power of the first lens group becomes large, and it becomes difficult to correct spherical aberration and curvature of field. It is not desirable. Meanwhile, it is possible to ensure the advantageous effect of the present embodiment more surely, if the upper limit value of the conditional expression (2-1) is set to 0.55.

Further, the present variable magnification optical system satisfies the following conditional expressions (2-2) is satisfied:

$$0.15 < |fb|/f1 < 2.50 \quad (2\text{-}2)$$

where fb denotes a focal length of said second focusing lens group and f1 denotes the focal length of said first lens group.

The conditional expression (2-2) defines a ratio of the focal length of the second focusing lens group relative to the focal length of the first lens group. By satisfying the conditional expression (2-2), it is possible to correct superbly spherical aberration, coma aberration and curvature of field.

When the value of |fb|/f1 is equal to or falls below the lower limit of the conditional expression (2-2), refractive power of the second focusing lens group becomes large, and it becomes difficult to correct spherical aberration and coma aberration. Meanwhile, in order to ensure the advantageous effect of the present embodiment, it is preferable to set the lower limit value of the conditional expression (2-2) to 0.30.

When the value of |fb|/f1 is equal to or exceeds the upper limit of the conditional expression (2-2), refractive power of the first lens group becomes large, and it becomes difficult to correct spherical aberration and curvature of field. Meanwhile, it is possible to ensure the advantageous effect of the present embodiment more surely, if the upper limit value of the conditional expression (2-2) is set to 1.80.

By the above described configuration, it is possible realize a variable magnification optical system which can suppress variation in aberrations caused by varying magnification and has a high optical performance.

Further, in the present variable magnification optical system, it is desirable that at least a portion of the intermediate lens group is so moved to include a component in a direction perpendicular to the optical axis.

With this configuration, it is possible to reduce variation in optical performance upon conducting vibration reduction and to make the vibration reduction unit compact.

Further, in the present variable magnification optical system, it is preferable that the following conditional expression (2-3) is satisfied:

$$0.30 < |fa/fb| < 0.90 \quad (2\text{-}3)$$

where fa denotes the focal length of said first focusing lens group, and fb denotes the focal length of said second focusing lens group.

The conditional expression (2-3) defines a ratio of the focal length of the first focusing lens group relative to the focal length of the second focusing lens group. By satisfying the conditional expression (2-3), it is possible to correct superbly variation in aberrations caused by focusing.

When the value of |fa/fb| is equal to or falls below the lower limit of the conditional expression (2-3), refractive power of the first focusing lens group becomes large, and it becomes difficult to correct spherical aberration and coma aberration upon focusing on a close distance. This is not preferable. Meanwhile, in order to ensure the advantageous effect of the present embodiment more surely, it is preferable to set the lower limit value of the conditional expression (2-3) to 0.33.

When the value of |fa/fb| is equal to or exceeds the upper limit of the conditional expression (2-3), refractive power of the second focusing group becomes large, and it becomes difficult to correct spherical aberration and coma aberration upon focusing on a close distance. This is not preferable. Meanwhile, in order to ensure the advantageous effect of the present embodiment more surely, it is preferable to set the upper limit value of the conditional expression (2-3) to 0.85.

Further, in the present variable magnification optical system, it is desirable that the following conditional expressions (2-4) is satisfied:

$$0.20 < |fa|/(-fr) < 1.00 \quad (2\text{-}4)$$

where fa denotes the focal length of the first focusing lens group and fr denotes the focal length of the rear lens group.

The conditional expression (2-4) defines a ratio of the focal length of the first focusing lens group relative to the focal length of the rear lens group. By satisfying the conditional expression (2-4), it is possible to correct superbly spherical aberration and curvature of field.

When the value of |fa|/(−fr) is equal to or falls below the lower limit of the conditional expression (2-4) of the present variable magnification optical system according to the present second embodiment, refractive power of the first focusing lens group becomes large, and it becomes difficult to correct spherical aberration and curvature of field. This is not preferable. Meanwhile, it is possible to secure the advantageous effect of the present embodiment more surely, if the lower limit value of the conditional expression (2-4) is made to be 0.35.

When the value of |fa|/(−fr) is equal to or exceeds the upper limit of the conditional expression (2-4), refractive power of the rear lens group becomes large, and it becomes difficult to correct spherical aberration and curvature of field. This is not preferable. Meanwhile, in order to ensure the advantageous effect of the present embodiment more surely, it is preferable to set the upper limit value of the conditional expression (2-4) to 0.92.

Further, in the present variable magnification optical system, it is desirable that said first focusing lens group consists of two positive lenses and one negative lens.

With this configuration, it is possible to reduce variation in optical performance upon focusing and to make the focusing unit compact.

Further, in the present variable magnification optical system, it is desirable that the following conditional expression (2-5) is satisfied:

$$0.50 < Xat/D3a < 3.00 \qquad (2\text{-}5)$$

where Xat denotes a distance which said first focusing lens group moves upon focusing from an infinite distance object to a close distance object in a telephoto end state and D3a denotes a distance from a most object side lens surface of the first focusing lens group to a most image side lens surface of the first focusing lens group.

The conditional expression (2-5) defines a ratio of an amount of movement of the first focusing lens group for focusing at a telephoto end relative to the entire thickness of the first focusing lens group. By satisfying the conditional expression (2-5), both of a high optical performance at the time of a close distance focusing and making a lens barrel compact can be attained.

When the value of Xat/D3a is equal to or falls below the lower limit of the conditional expression (2-5) of the present variable magnification optical system according to the present second embodiment, an amount of movement of the first focusing lens group for focusing decreases. Accordingly, refractive power of the first focusing lens group has to be strengthened in order to focus on a desired close distance, so it becomes difficult to correct spherical aberration and curvature of field. It is not desirable. Meanwhile, in order to ensure the advantageous effect of the present embodiment, it is preferable to set the lower limit value of the conditional expression (2-5) to 0.70.

When the value of Xat/D3a is equal to or exceeds the upper limit of the conditional expression (2-5), an amount of movement of the first focusing lens group for focusing becomes large and the lens barrel also becomes large in size. It is not preferable. Meanwhile, it is possible to ensure the advantageous effect of the present embodiment more surely, if the upper limit value of the conditional expression (2-5) is set to 2.20.

An optical apparatus according to the present embodiment comprises the variable magnification optical system having the above described configuration. With this configuration, it is possible to realize an optical apparatus which can suppress variation in aberrations caused by varying magnification and has a high optical performance.

A method for manufacturing the present variable magnification optical system according to the present second embodiment is a method for manufacturing a magnification optical system comprising, in order from an object side: a first lens group having positive refractive power, an intermediate lens group having negative refractive power, a first focusing lens group having positive refractive power, a second focusing lens group having positive refractive power and a rear lens group having negative refractive power;

the method comprising the steps of:

constructing such that, upon varying magnification from a wide angle end state to a telephoto end state, the first lens group is moved, and an interval between said first lens group and said intermediate lens group, an interval between said intermediate lens group and said first focusing lens group, an interval between said first focusing lens group and said second focusing lens group and an interval between said second focusing lens group and said rear lens group are varied;

constructing such that, upon focusing from an infinite distance object to a close distance object, said first focusing lens group and said second focusing lens group are moved along the optical axis with different trajectories from each other; and constructing such that, the following conditional expressions (2-1) and (2-2) are satisfied:

$$0.15 < |fa|/f1 < 0.65 \qquad (2\text{-}1)$$

$$0.15 < |fb|/f1 < 2.50 \qquad (2\text{-}2)$$

where fa denotes a focal length of said first focusing lens group, fb denotes a focal length of said second focusing lens group, and f1 denotes a focal length of said first lens group.

By the above described manufacturing method, it is possible to manufacture a variable magnification optical system which can suppress variation in aberrations and has a high optical performance.

Hereinafter, variable magnification optical systems relating to numerical examples of the present application will be explained with reference to the accompanying drawings. The First Example to the Fifth Example below are common to the first embodiment and the second embodiment of the present application.

(First Example)

FIG. 1 is a sectional view showing a lens configuration of a variable magnification optical system according to the First Example which is common to the first embodiment and the second embodiment of the present application.

The variable magnification optical system according to the present First Example is composed of, in order from an object side along the optical axis: a first lens group G1 having positive refractive power, an intermediate lens group Gm having negative refractive power, a first focusing lens group Ga having positive refractive power, a second focusing lens group Gb having positive refractive power and a rear lens group Gr having negative refractive power.

The first lens group G1 consists of, in order from the object side, a negative meniscus lens L11 having a convex surface facing the object side, a positive meniscus lens L12 having a convex surface facing the object side and a double convex positive lens L13.

The intermediate lens group Gm consists of, in order from the object side, a negative meniscus lens L21 having a convex surface facing the object side, a double concave negative lens L22, a double convex positive lens L23, a cemented lens constructed by a positive meniscus lens L24 having a concave surface facing the object side cemented with a double concave negative L25, and a negative meniscus lens L26 having a concave surface facing the object side.

The first focusing lens group Ga consists of, in order from the object side, a double convex positive lens L31 and a cemented lens constructed by a positive meniscus lens L32 having a convex surface facing the object side cemented with a double convex positive lens L33.

The second focusing lens group Gb consists of, in order from the object side, a negative meniscus lens L41 having a concave surface facing the object side, a double convex positive lens L42 and a double convex positive lens L43.

The rear group Gr consists of, in order from the object side, a cemented lens constructed by a negative meniscus lens L51 having a convex surface facing the object side cemented with a positive meniscus lens L52 having a convex surface facing the object side, and a negative meniscus lens L53 having a concave surface facing the object side.

In the variable magnification optical system according to the present Example, varying magnification from a wide-angle end state to a telephoto end state is conducted by moving each lens group toward the object side while varying an interval between the first lens group G1 and the intermediate lens group Gm, an interval between the intermediate lens group Gm and the first focusing lens group Ga, an interval between the first focusing lens group Ga and the second focusing lens group Gb and an interval between the second focusing lens group Gb and the rear lens group Gr.

An aperture stop S is disposed between the intermediate lens group Gm and the first focusing lens group Ga and is moved toward the object side with the first focusing lens Ga upon varying magnification from a wide-angle end state to a telephoto end state.

In the variable magnification optical system according to the present Example, focusing from an infinite distance object to a close distance object is carried out by moving the first focusing lens group Ga toward the image side and also moving the second focusing lens group Gb toward the object side.

Further, in the variable magnification optical system according to the present Example, vibration reduction is conducted by moving, as a vibration reducing lens, the negative lens L22 in the intermediate group Gm to have a component in a direction perpendicular to the optical axis.

Here, in an entire lens system having a focal length of f, a vibration reduction coefficient (which is a ratio of a moving amount of an image on the image plane to that of a moving lens group for correcting a camera shake) of K, in order to correct rotational camera shake of an angle θ, the vibration reduction lens for correcting the camera shake may be moved by the amount of (f·tanθ)/K perpendicularly to the optical axis. In the wide-angle end state of the variable magnification optical system according to the present Example, the vibration reduction coefficient is −0.997, and the moving amount of the vibration reducing lens group for correcting a rotational camera shake of 0.20 degrees is −0.289. In the telephoto end state, the vibration reduction coefficient is −1.627, so the moving amount of the vibration reducing lens group for correcting a rotational camera shake of 0.10 degrees is −0.197.

Various values of the variable magnification optical system according to the present First Example, are listed in Table 1 below.

In [Surface Data], "m" shows the lens surface number counted in order from the object side, "r" shows a radius of curvature, "d" shows a face to face distance, that is, a distance from n-th surface (n is an integer) to (n+1)-th surface, "nd" shows refractive index of the material at d-line (wavelength λ=587.6 nm), and "vd" shows Abbe number of the material at d-line (wavelength λ=587.6 nm). OP denotes an object surface, "dn" denotes a variable distance from n-th surface to (n+1)-th surface, BF denotes a back focal length, and "I" denotes an image plane. Meanwhile, In the radius of curvature r, "∞" denotes a plane surface, and refractive index of the air nd=1.000000 is omitted.

In [Various Data], "f" denotes a focal length, FNO denotes an F-number, "ω" denotes a half angle of view in degrees, "Y" denotes a maximum image height, "TL" denotes a total length of the entire optical system, that is, a distance from the 1-st lens surface to the image plane I, and "Bf" denotes a back focal length.

In [Variable Distance Data], "dn" denotes a variable distance between the n-th surface (n is an integer) to the (n+1)-th surface. "W" denotes a wide-angle end state, "M" denotes an intermediate focal length, and "T" denotes a telephoto end state. Meanwhile, "d0" denotes a distance from the object to the 1-st surface.

In [Lens Group Data], a starting surface number and a focal length of each lens group are shown. In [Lens Group Data], "G1" denotes the first lens group G1, "Gm" denotes the intermediate lens group Gm, "Ga" denotes the first focusing lens group Ga, "Gb" denotes the second focusing lens group Gb and "Gr" denotes the rear lens group Gr. Furthermore, "ST" denotes the starting surface, and "f" denotes the focal length.

In [Values for Conditional Expressions], the respective values for the conditional expressions are shown.

For the unit of length, such as the focal length "f", the radius of curvature "r" and others, "mm" is generally used for the unit of length. However, since similar optical performance can be obtained by an optical system proportionally enlarged or reduced its dimension, the unit is not necessarily to be limited to "mm".

Meanwhile, symbols used in Table 1 described above, are similarly used in tables with respect to the respective examples described later.

TABLE 1

| | First Example [Surface Data] | | | |
|---|---|---|---|---|
| m | r | d | nd | vd |
| OP | ∞ | ∞ | | |
| 1 | 71.463 | 2.500 | 1.84666 | 23.80 |
| 2 | 53.640 | 0.170 | | |
| 3 | 54.383 | 7.488 | 1.49782 | 82.57 |
| 4 | 351.083 | 0.100 | | |
| 5 | 103.602 | 4.963 | 1.48749 | 70.31 |
| 6 | −1689.645 | d6 | | |
| 7 | 77.466 | 1.000 | 1.69680 | 55.52 |
| 8 | 31.428 | 8.906 | | |
| 9 | −60.298 | 1.000 | 1.45600 | 91.36 |
| 10 | 86.778 | 20.900 | | |
| 11 | 45.641 | 4.728 | 1.84666 | 23.80 |
| 12 | −174.683 | 8.745 | | |
| 13 | −70.155 | 5.440 | 1.45600 | 91.36 |
| 14 | −54.126 | 1.000 | 1.78472 | 25.64 |
| 15 | 243.505 | 2.485 | | |
| 16 | −38.089 | 1.000 | 1.90200 | 25.26 |
| 17 | −88.608 | d17 | | |
| 18 | ∞ | 1.000 | Aperture | stop S |
| 19 | 64.422 | 5.197 | 1.49782 | 82.57 |
| 20 | −60.192 | 0.100 | | |
| 21 | 92.117 | 1.646 | 1.95000 | 29.37 |
| 22 | 26.483 | 7.056 | 1.62004 | 36.40 |
| 23 | −125.542 | d23 | | |
| 24 | −34.179 | 1.544 | 1.68893 | 31.16 |
| 25 | −104.367 | 0.155 | | |
| 26 | 60.179 | 4.668 | 1.49782 | 82.57 |
| 27 | −70.045 | 8.001 | | |
| 28 | 407.807 | 2.142 | 2.00069 | 25.46 |
| 29 | −276.079 | d29 | | |
| 30 | 62.597 | 2.000 | 1.85026 | 32.35 |
| 31 | 17.984 | 7.208 | 1.78472 | 25.64 |

TABLE 1-continued

| 32 | 170.439 | 3.275 | | |
|----|---------|-------|---------|-------|
| 33 | −35.863 | 1.500 | 1.90366 | 31.27 |
| 34 | −148.251 | Bf | | |
| I | ∞ | | | |

[Various Data]

f = 82.58 – 183.47
FNO = 4.55 – 5.89
ω = 14.57 – 6.55
Y = 21.60
TL = 217.28 – 256.77
Bf = 38.44 – 57.18

[Variable Distance Data]

| | Infinity | | | Close Distance (shooting distance 0.35 m) | | |
|---|---|---|---|---|---|---|
| | W | M | T | W | M | T |
| d0 | ∞ | ∞ | ∞ | 132.71 | 110.99 | 93.22 |
| d6 | 1.000 | 13.780 | 26.565 | 1.000 | 13.780 | 26.565 |
| d17 | 12.633 | 7.000 | 1.000 | 21.001 | 19.075 | 18.752 |
| d23 | 25.494 | 33.000 | 43.644 | 8.339 | 8.245 | 7.252 |
| d29 | 23.789 | 18.500 | 12.460 | 32.576 | 31.179 | 31.100 |

[Lens Group Data]

| | ST | f |
|---|----|---|
| G1 | 1 | 114.355 |
| Gm | 7 | −29.383 |
| Ga | 19 | 54.486 |
| Gb | 24 | 117.158 |
| Gr | 30 | −83.536 |

[Values for Conditional Expressions]

(1-1) |fa/fb| = 0.47
(1-2) |fa|/f1 = 0.48
(1-3) |fa|/(−fr) = 0.65
(1-4) Xat/D3a = 1.27
(2-1) |fa|/f1 = 0.48
(2-2) |fb|/f1 = 1.02
(2-3) |fa/fb| = 0.47
(2-4) |fa|/(−fr) = 0.65
(2-5) Xat/D3a = 1.27

Figure 2A:
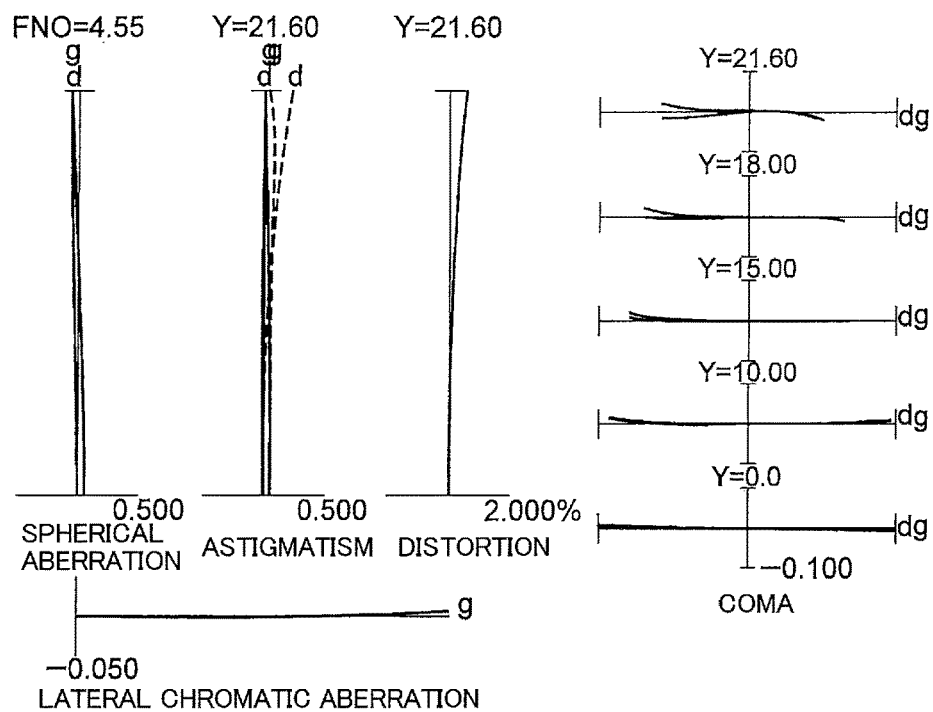
Figure 2B:
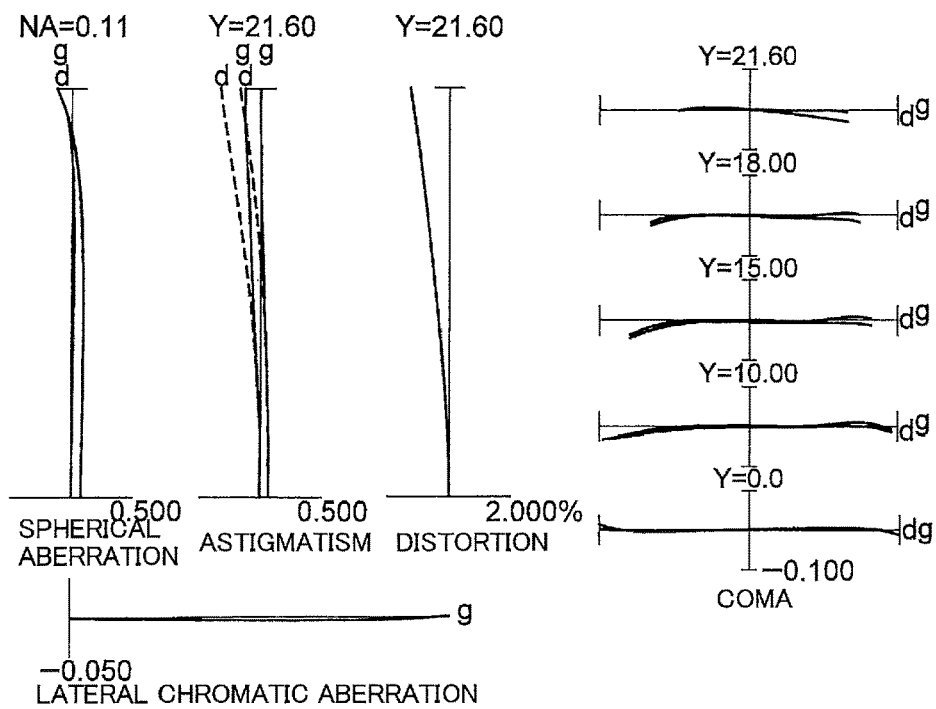

FIG. 2A is a graph showing various aberrations of the variable magnification optical system according to the First Example upon focusing on an infinity in a wide angle end state, and FIG. 2B is a graph showing various aberrations of the variable magnification optical system according to the First Example upon focusing on a close distance object in a wide angle end state.

FIG. 3A is a graph showing various aberrations of the variable magnification optical system according to the First Example upon focusing on an infinity in an intermediate focal length state, and FIG. 3B is a graph showing various aberrations of the variable magnification optical system according to the First Example upon focusing on a close distance object in the intermediate focal length state.

Figure 4A:
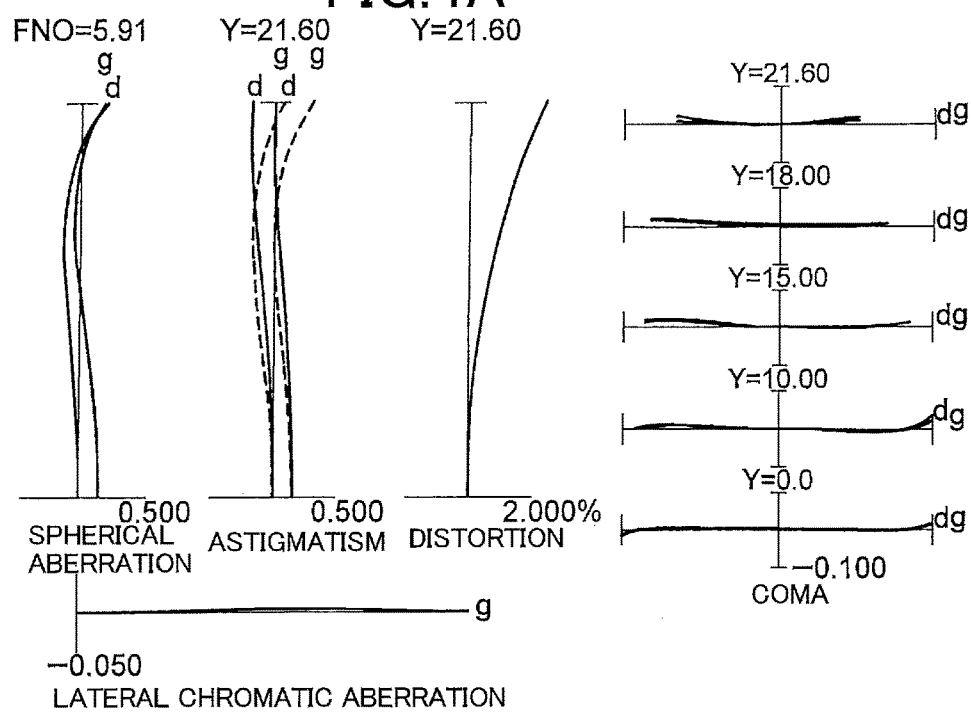
Figure 4B:
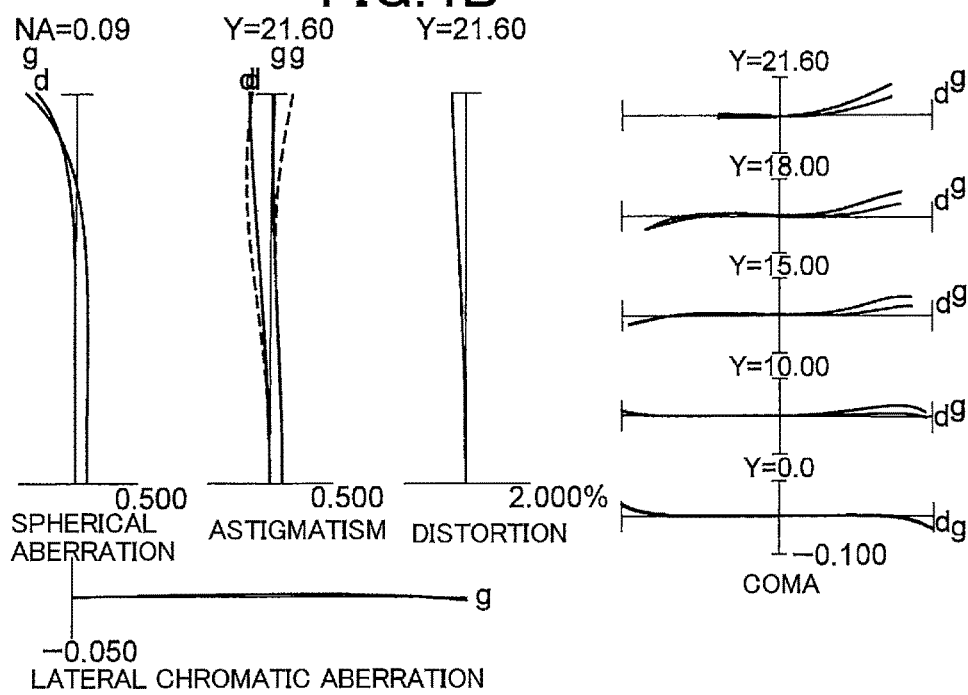

FIG. 4A is a graph showing various aberrations of the variable magnification optical system according to the First Example upon focusing on an infinity in a telephoto end state, and FIG. 4B is a graph showing various aberrations of the variable magnification optical system according to the First Example upon focusing on a close distance object in the telephoto end state.

In respective graphs shown in FIG. 2A to FIG. 4B, "FNO" denotes an F-number, "NA" denotes a numerical aperture, and "Y" denotes an image height. In graphs showing a spherical aberration, F-number or numerical aperture value corresponding to the maximum aperture diameter, is shown. In graphs showing astigmatism and distortion, the maximum value of the image height is shown. In graphs showing coma aberration, value with respect to each image height is shown. In respective graphs, "d" denotes aberration curve at d-line (wavelength λ=587.6 nm), and "g" denotes aberration curve at g-line (wavelength λ=435.8 nm). In graphs showing astigmatism, a solid line indicates a sagittal image plane, and a broken line indicates a meridional image plane. The symbols as above-described with respect to the present Example 1 are the same, regarding various aberration graphs of respective examples described below.

As is apparent from the respective graphs, the variable magnification optical system according to the First Example can correct excellently various aberrations from the wide angle end state to the telephoto end state and shows superb optical performance.

(Second Example)

Figure 5:
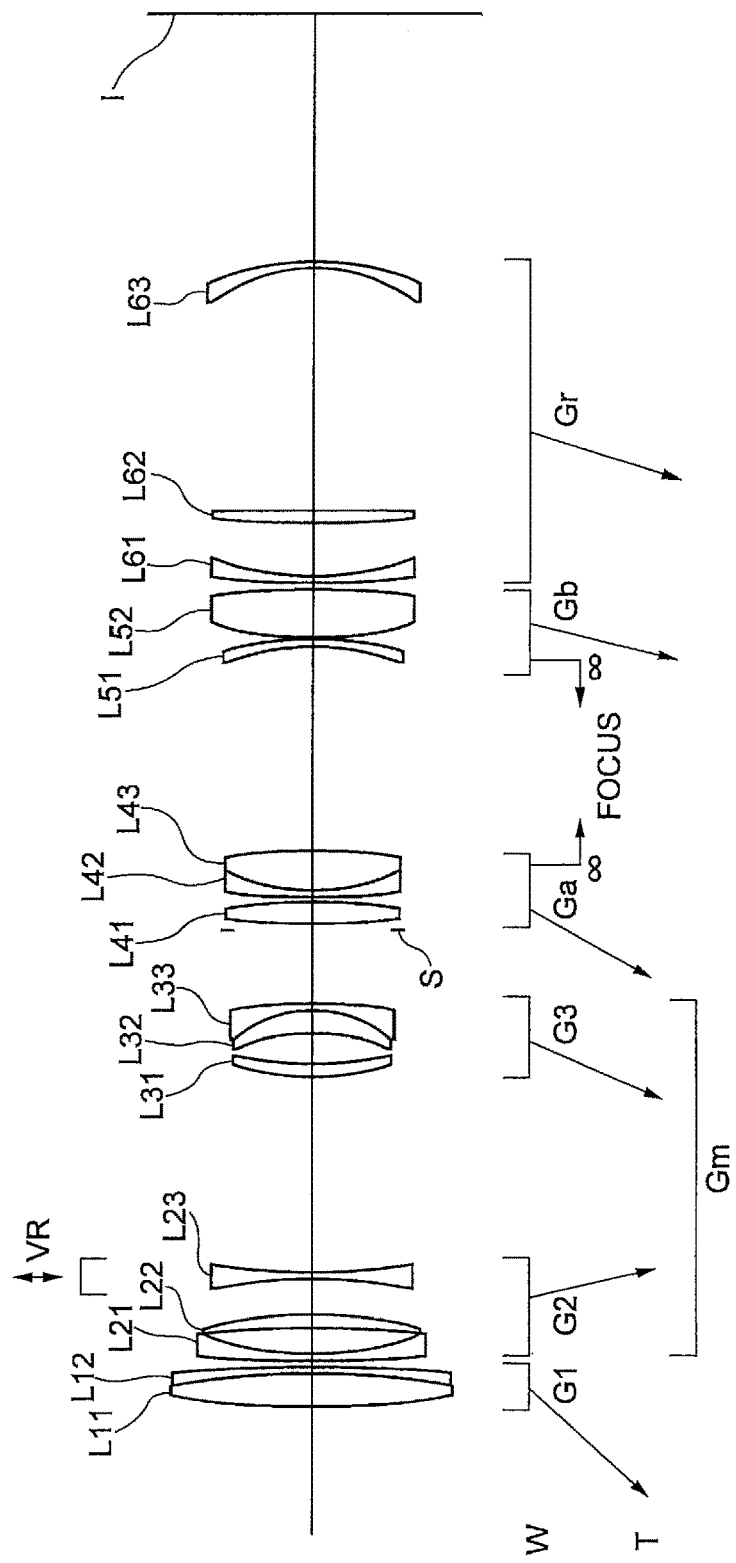
FIG. 5 is a sectional view showing a lens configuration of a variable magnification optical system according to a Second Example that is common to the first and the second embodiments of the present application.

FIG. 5 is a sectional view showing a lens configuration of a variable magnification optical system according to the Second Example which is common to the first embodiment and the second embodiment of the present application.

The variable magnification optical system according to the present Second Example is composed of, in order from an object side along the optical axis: a first lens group G1 having positive refractive power, an intermediate lens group Gm having negative refractive power, a first focusing lens group Ga having positive refractive power, a second focusing lens group Gb having positive refractive power and a rear lens group Gr having negative refractive power.

The first lens group G1 consists of, in order from the object side along the optical axis, a cemented lens constructed by a double convex positive lens L11 cemented with a negative meniscus lens L12 having a concave surface facing the object side.

The intermediate lens group Gm consists of, in order from the object side along the optical axis, a second lens group G2 having negative refractive power and a third lens group G3 having negative refractive power. The second lens group G2 consists of, in order from the object side, a negative meniscus lens L21 having a convex surface facing the object side, a positive meniscus lens L22 having a concave surface facing the object side and a double concave negative lens L23. The third lens group G3 consists of, in order from the object side, a positive meniscus lens L31 having a convex surface facing the object side and a cemented lens constructed by a positive meniscus lens L32 having a concave surface facing the object side cemented with a negative meniscus lens L33 having a concave surface facing the object side.

The first focusing lens group Ga consists of, in order from the object side along the optical axis, a double convex positive lens L41 and a cemented lens constructed by a negative meniscus lens L42 having a convex surface facing the object side cemented with a double convex positive lens L43.

The second focusing lens group Gb consists of, in order from the object side along the optical axis, a negative meniscus lens L51 having a concave surface facing the object side, and a double convex positive lens L52.

The rear group Gr consists of, in order from the object side along the optical axis, a negative meniscus lens L61 having a convex surface facing the object side, a double convex positive lens L62 and a negative meniscus lens L63 having a concave surface facing the object side.

In the variable magnification optical system according to the present Example, varying magnification from a wide-angle end state to a telephoto end state is conducted by moving each lens group while varying an interval between the first lens group G1 and the second lens group G2, an interval between the second lens group G2 and the third lens group G3, an interval between the third lens group G3 and the first focusing lens group Ga, an interval between the first focusing lens group Ga and the second focusing lens group Gb and an interval between the second focusing lens group Gb and the rear lens group Gr. At this time, the first lens group G1, the third lens group G3, the first focusing lens group Ga, the second focusing lens group Gb and the rear lens group Gr are moved toward the object side, and the second lens group G2 is moved toward the image side.

An aperture stop S is disposed between the third lens group G3 and the first focusing group Ga and is moved toward the image side with the first focusing lens Ga upon varying magnification from a wide-angle end state to a telephoto end state.

In the variable magnification optical system according to the present Example, focusing from an infinite distance object to a close distance object is carried out by moving the first focusing lens group Ga toward the image side and also moving the second focusing lens group Gb toward the object side.

Further, in the variable magnification optical system according to the present Example, vibration reduction is conducted by moving, as a vibration reducing lens, the negative lens L23 in the second lens group G2 to have a component in a direction perpendicular to the optical axis.

In the present example, a vibration reduction coefficient, the vibration reduction coefficient in the wide angle end state is −0.859, so the moving amount of the vibration reduction lens group for correcting a rotational camera shake of 0.20 degrees is −0.325. Further, the vibration reduction coefficient in the telephoto end state is −1.463, so the moving amount of the vibration reduction lens group for correcting a rotational camera shake of 0.10 degrees is −0.227.

Various values of the variable magnification optical system according to the present Second Example, are listed in Table 2 below.

TABLE 2

[Surface Data]

| m | r | d | nd | vd |
|---|---|---|---|---|
| OP | ∞ | ∞ | | |
| 1 | 132.379 | 5.582 | 1.59319 | 67.90 |
| 2 | −141.786 | 1.000 | 1.95000 | 29.37 |
| 3 | −289.688 | d3 | | |
| 4 | 260.411 | 1.000 | 1.60300 | 65.44 |
| 5 | 49.251 | 4.145 | | |
| 6 | −183.001 | 2.112 | 1.84666 | 23.80 |
| 7 | −78.823 | 5.929 | | |
| 8 | −76.924 | 1.000 | 1.49782 | 82.57 |
| 9 | 114.526 | d9 | | |
| 10 | 39.151 | 2.066 | 1.75520 | 27.57 |
| 11 | 61.977 | 4.738 | | |
| 12 | −33.490 | 3.682 | 1.90200 | 25.26 |
| 13 | −20.411 | 1.000 | 1.79504 | 28.69 |
| 14 | −96.289 | d14 | | |
| 15 | ∞ | 1.000 | Aperture | stop S |
| 16 | 109.097 | 3.528 | 1.78590 | 44.17 |
| 17 | −101.454 | 0.694 | | |
| 18 | 120.761 | 1.000 | 1.83400 | 37.18 |
| 19 | 30.639 | 6.308 | 1.49782 | 82.57 |
| 20 | −110.561 | d20 | | |
| 21 | −39.642 | 1.000 | 1.74077 | 27.74 |
| 22 | −60.559 | 0.100 | | |
| 23 | 49.953 | 7.784 | 1.59319 | 67.90 |
| 24 | −136.144 | d24 | | |
| 25 | 135.022 | 1.000 | 1.72000 | 43.61 |
| 26 | 45.084 | 8.560 | | |
| 27 | 151.175 | 1.873 | 1.84666 | 23.80 |
| 28 | −835.270 | 38.079 | | |
| 29 | −29.388 | 1.000 | 1.45600 | 91.36 |
| 30 | −45.581 | Bf | | |
| I | ∞ | | | |

[Various Data]

f = 79.99 − 190.07
FNO = 4.77 − 5.69
ω = 15.02 − 6.37
Y = 21.60
TL = 219.89 − 254.22
Bf = 38.99 − 56.78

[Variable Distance Data]

| | Infinity | | | Close Distance (shooting distance 0.37 m) | | |
|---|---|---|---|---|---|---|
| | W | M | T | W | M | T |
| d0 | ∞ | ∞ | ∞ | 150.10 | 134.34 | 115.77 |
| d3 | 1.000 | 21.543 | 50.873 | 1.000 | 21.543 | 50.873 |
| d9 | 30.888 | 14.465 | 1.000 | 30.888 | 14.465 | 1.000 |
| d14 | 11.661 | 6.331 | 1.000 | 20.377 | 19.123 | 20.878 |
| d20 | 32.160 | 35.130 | 38.773 | 16.298 | 11.848 | 2.594 |
| d24 | 1.000 | 1.158 | 1.605 | 8.146 | 11.647 | 17.905 |

[Lens Group Data]

| | ST | f |
|---|---|---|
| G1 | 1 | 191.259 |
| G2 | 4 | −66.454 |
| G3 | 10 | −210.475 |
| Ga | 16 | 66.080 |
| Gb | 21 | 100.274 |
| Gr | 25 | −100.315 |

| | | f | |
|---|---|---|---|
| | ST | Wide Angle End | Telephoto End |
| Gm | 4 | −42.939 | −47.277 |

[Values for Conditional Expressions]

(1-1) |fa/fb| = 0.66
(1-2) |fa|/f1 = 0.35
(1-3) |fa|/(−fr) = 0.66
(1-4) Xat/D3a = 1.72
(2-1) |fa|/f1 = 0.35
(2-2) |fb|/f1 = 0.52
(2-3) |fa/fb| = 0.66
(2-4) |fa|/(−fr) = 0.66
(2-5) Xat/D3a = 1.72

FIG. 6A is a graph showing various aberrations of the variable magnification optical system according to the Second Example upon focusing on an infinity in a wide angle end state, and FIG. 6B is a graph showing various aberrations of the variable magnification optical system according to the Second Example upon focusing on a close distance object in a wide angle end state.

Figure 7A:
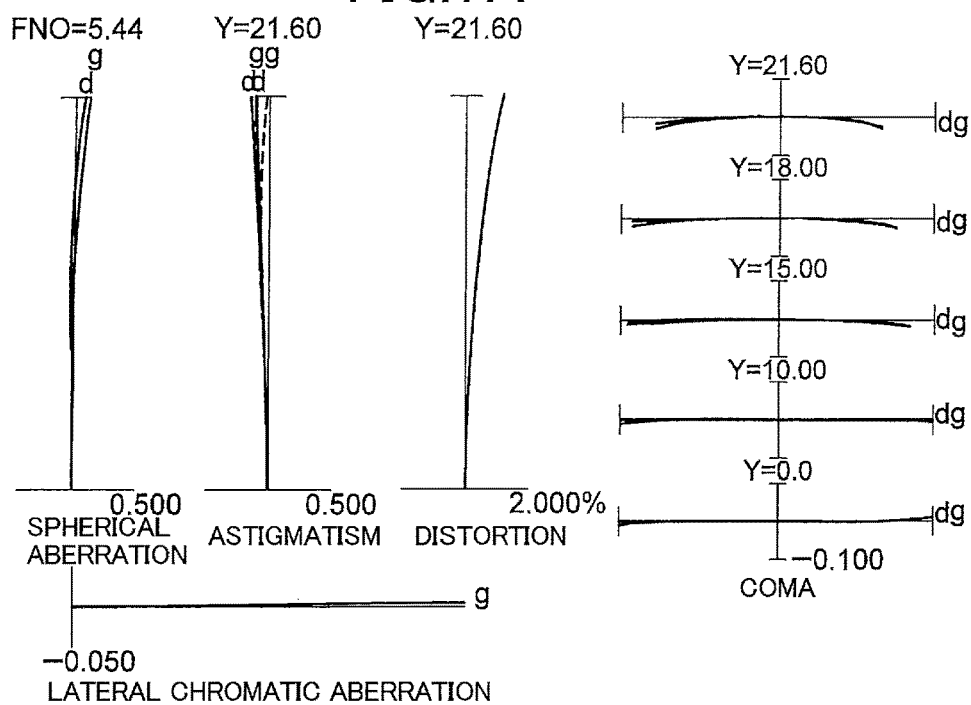
Figure 7B:
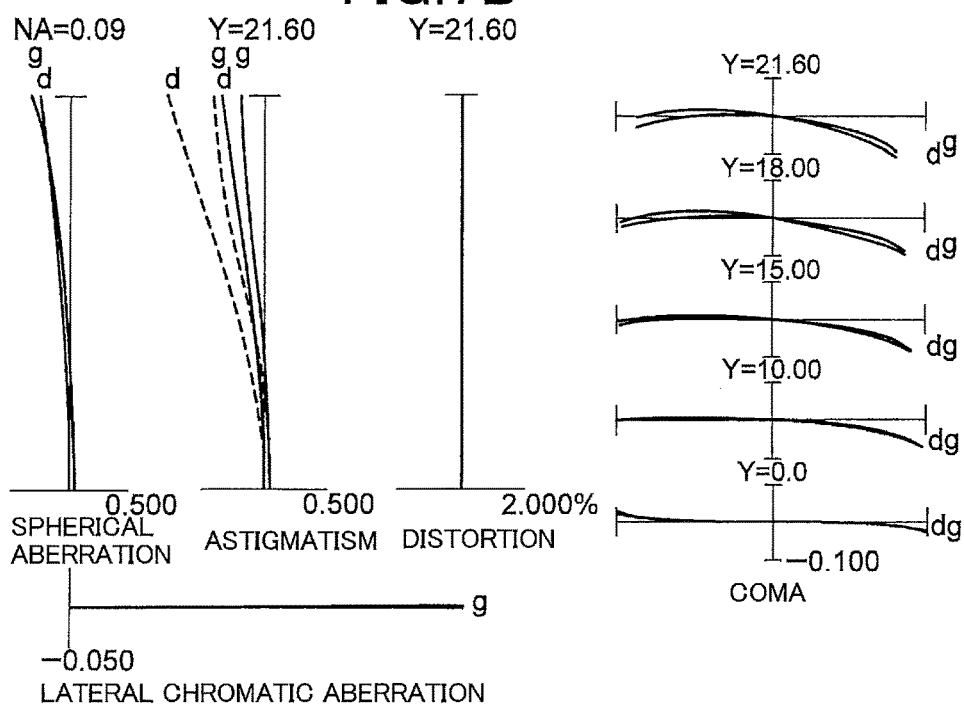

FIG. 7A is a graph showing various aberrations of the variable magnification optical system according to the Second Example upon focusing on an infinity in an intermediate focal length state, and FIG. 7B is a graph showing various aberrations of the variable magnification optical system according to the Second Example upon focusing on a close distance object in the intermediate focal length state.

Figure 8A:
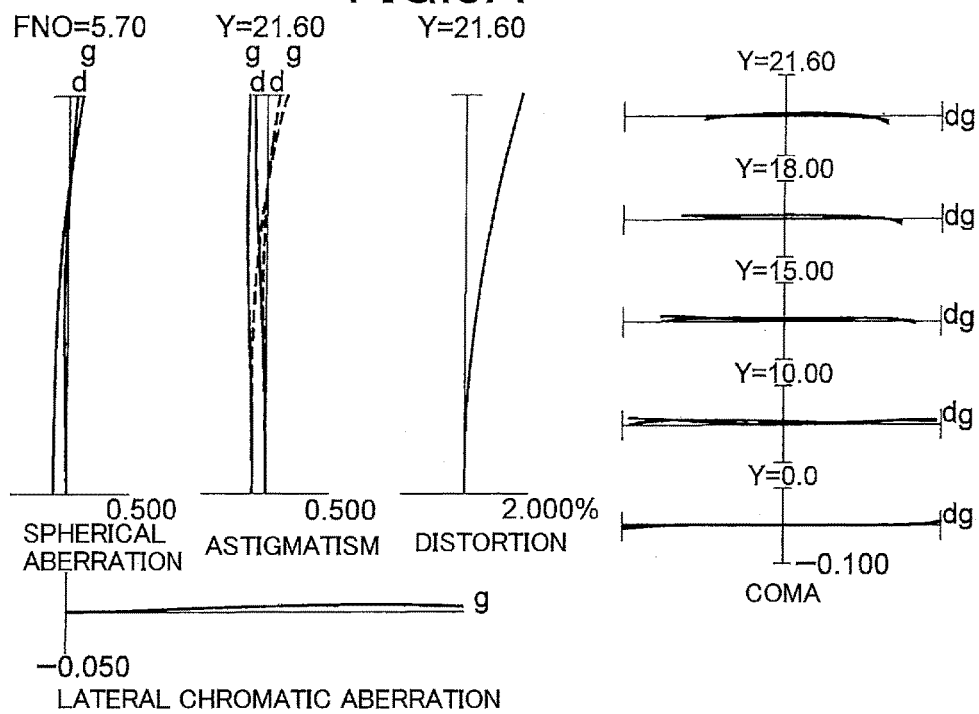
Figure 8B:
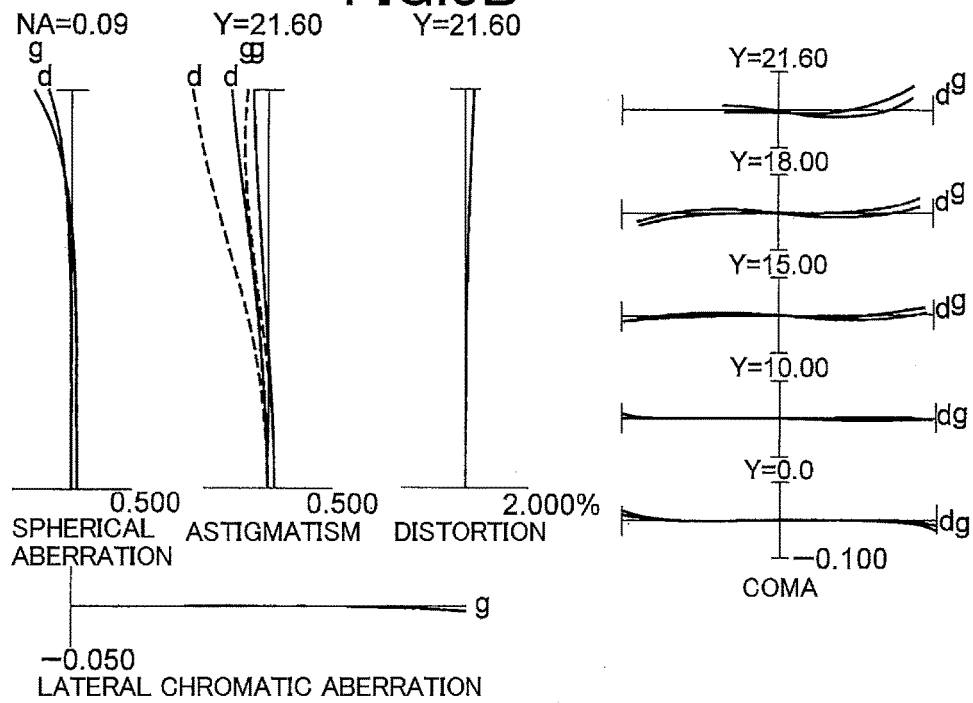

FIG. 8A is a graph showing various aberrations of the variable magnification optical system according to the Second Example upon focusing on an infinity in a telephoto end state, and FIG. 8B is a graph showing various aberrations of the variable magnification optical system according to the Second Example upon focusing on a close distance object in the telephoto end state.

As is apparent from the respective graphs, the variable magnification optical system according to the Second Example can correct excellently various aberrations from the wide angle end state to the telephoto end state and shows superb optical performance.

(Third Example)

Figure 9:
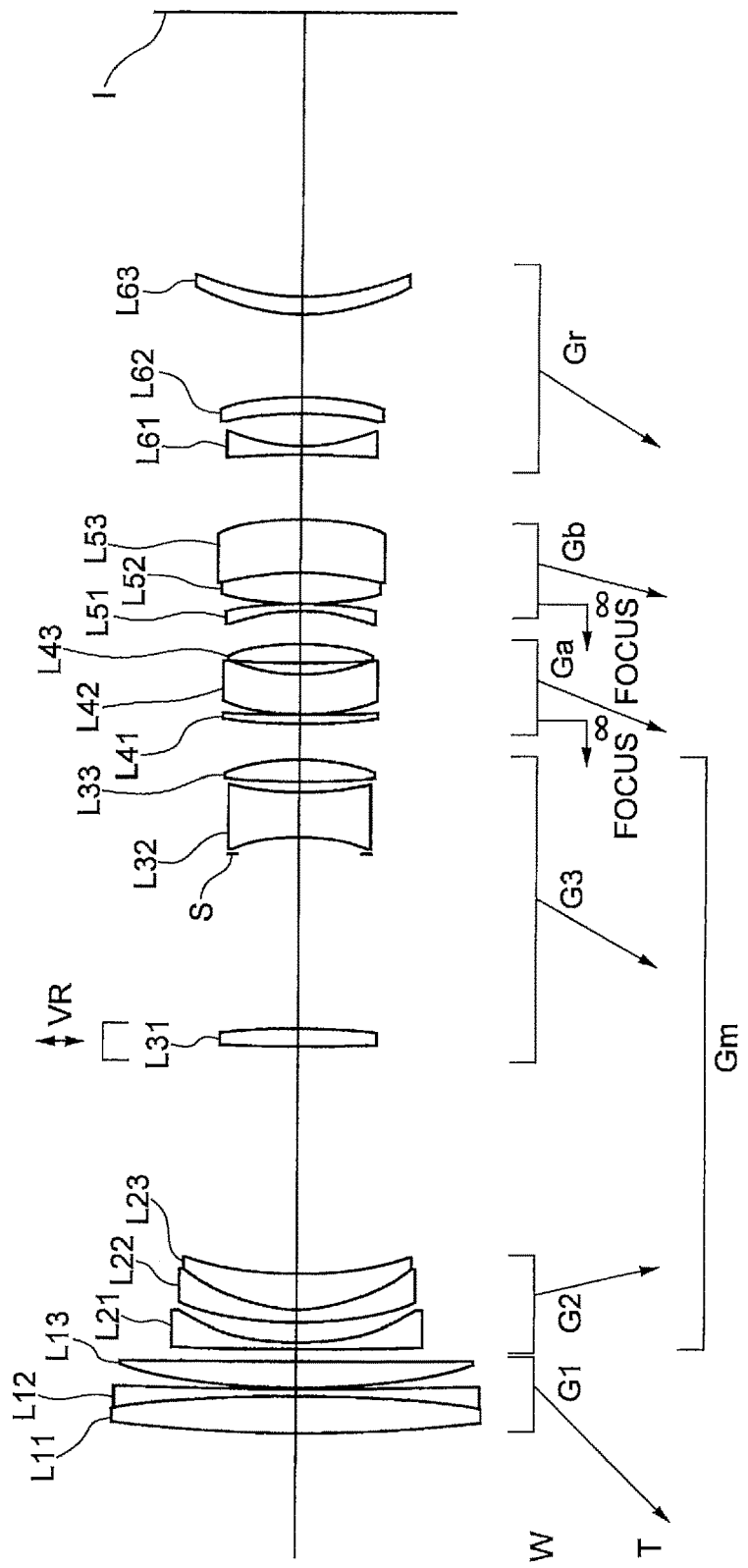
FIG. 9 is a sectional view showing a lens configuration of a variable magnification optical system according to a Third Example that is common to the first embodiment and the second embodiment of the present application.

FIG. 9 is a sectional view showing a lens configuration of a variable magnification optical system according to the Third Example which is common to the first embodiment and the second embodiment of the present application.

The variable magnification optical system according to the present according to the present Third Example is composed of, in order from an object side along the optical axis: a first lens group G1 having positive refractive power, an intermediate lens group Gm having negative refractive power, a first focusing lens group Ga having positive refractive power, a second focusing lens group Gb having positive refractive power and a rear lens group Gr having negative refractive power.

The first lens group G1 consists of, in order from the object side along the optical axis, a cemented lens constructed by a double convex positive lens L11 cemented with a negative meniscus lens L12 having a concave surface facing the object side, and a positive meniscus lens L13 having a convex surface facing the object side.

The intermediate lens group Gm consists of, in order from the object side along the optical axis, a second lens group G2 having negative refractive power and a third lens group G3 having negative refractive power. The second lens group G2 consists of, in order from the object side, a negative meniscus lens L21 having a convex surface facing the object side, and a cemented lens constructed by a negative meniscus lens L22 having a convex surface facing the object side cemented with a positive meniscus lens L23 having a convex surface facing the object side. The third lens group G3 consists of, in order from the object side, a double convex positive lens L31, an aperture stop S, a double concave negative lens L32 and a double convex positive lens L33.

The first focusing lens group Ga consists of, in order from the object side along the optical axis, a positive meniscus lens L41 having a convex surface facing the object side, a negative meniscus lens L42 having a convex surface facing the object side and a double convex positive lens L43.

The second focusing lens group Gb consists of, in order from the object side along the optical axis, a negative meniscus lens L51 having a concave surface facing the object side, and a cemented lens constructed by a double convex positive lens L52 cemented with a positive meniscus lens L53 having a concave surface facing the object side.

The rear group Gr consists of, in order from the object side along the optical axis, a double concave negative lens L61, a positive meniscus lens L62 having a concave surface facing the object side, and a positive meniscus lens L63 having a convex surface facing the object side.

In the variable magnification optical system according to the present Example, varying magnification from a wide-angle end state to a telephoto end state is conducted by moving each lens group while varying an interval between the first lens group G1 and the second lens group G2, an interval between the second lens group G2 and the third lens group G3, an interval between the third lens group G3 and the first focusing lens group Ga, an interval between the first focusing lens group Ga and the second focusing lens group Gb and an interval between the second focusing lens group Gb and the rear lens group Gr. At this time, the first lens group G1, the third lens group G3, the first focusing lens group Ga, the first focusing lens group Ga, the second focusing lens group Gb and the rear lens group Gr are moved toward the object side, and the second lens group G2 is moved toward the image side.

In the variable magnification optical system according to the present Example, focusing from an infinite distance object to a close distance object is carried out by moving the first focusing lens group Ga and the second focusing lens group Gb toward the object side.

Further, in the variable magnification optical system according to the present Example, vibration reduction is conducted by moving, as a vibration reducing lens, the positive lens L31 in the third lens group G3 to have a component in a direction perpendicular to the optical axis.

In the present example, the vibration reduction coefficient in the wide angle end state is 0.800, so the moving amount of the vibration reduction lens group for correcting a rotational camera shake of 0.20 degrees is 0.349. Further, the vibration reduction coefficient in the telephoto end state is 0.926, so the moving amount of the vibration reduction lens group for correcting a rotational camera shake of 0.10 degrees is 0.319.

Various values of the variable magnification optical system according to the present Third Example, are listed in Table 3 below.

TABLE 3

[Surface Data]

| m | r | d | nd | vd |
|---|---|---|---|---|
| OP | ∞ | ∞ | | |
| 1 | 243.908 | 6.260 | 1.75500 | 52.34 |
| 2 | −211.556 | 1.000 | 1.79504 | 28.69 |
| 3 | 718.913 | 0.100 | | |
| 4 | 111.535 | 4.424 | 1.49782 | 82.57 |
| 5 | 2560.718 | d5 | | |
| 6 | 674.846 | 1.000 | 1.80400 | 46.60 |
| 7 | 39.092 | 3.227 | | |
| 8 | 60.000 | 2.000 | 1.67270 | 32.19 |
| 9 | 29.083 | 5.961 | 1.90200 | 25.26 |
| 10 | 64.760 | d10 | | |
| 11 | 268.628 | 2.952 | 1.72916 | 54.61 |
| 12 | −134.879 | 27.783 | | |
| 13 | ∞ | 2.569 | Aperture | stop S |
| 14 | −34.187 | 7.220 | 1.61266 | 44.46 |
| 15 | 56.785 | 1.572 | | |
| 16 | 120.185 | 3.590 | 1.51742 | 52.20 |
| 17 | −35.826 | d17 | | |
| 18 | 103.298 | 1.378 | 1.80400 | 46.60 |
| 19 | 211.385 | 0.100 | | |
| 20 | 39.995 | 6.407 | 1.85026 | 32.35 |
| 21 | 35.723 | 1.719 | | |
| 22 | 218.536 | 3.153 | 1.57957 | 53.74 |
| 23 | −37.405 | d23 | | |
| 24 | −35.120 | 1.000 | 1.90200 | 25.26 |
| 25 | −69.299 | 0.100 | | |
| 26 | 60.453 | 4.946 | 1.49782 | 82.57 |
| 27 | −48.385 | 8.437 | 1.80518 | 25.45 |
| 28 | −44.915 | d28 | | |
| 29 | −139.300 | 1.261 | 1.77250 | 49.62 |
| 30 | 32.746 | 5.296 | | |
| 31 | −64.074 | 2.623 | 1.84666 | 23.80 |
| 32 | −46.215 | 13.092 | | |

TABLE 3-continued

| 33 | 37.231 | 2.934 | 1.66755 | 41.87 |
|---|---|---|---|---|
| 34 | 46.426 | Bf | | |
| I | ∞ | | | |

[Various Data]

f = 80.00 – 169.21
FNO = 4.61 – 5.79
ω = 14.97 – 7.06
Y = 21.60
TL = 226.25 – 266.25
Bf = 44.99 – 63.22

[Variable Distance Data]

| | Infinity | | | Close Distance (shooting distance 0.40 m) | | |
|---|---|---|---|---|---|---|
| | W | M | T | W | M | T |
| d0 | ∞ | ∞ | ∞ | 173.74 | 154.77 | 133.74 |
| d5 | 2.000 | 27.541 | 51.021 | 2.000 | 27.541 | 51.021 |
| d10 | 36.135 | 20.567 | 4.999 | 36.135 | 20.567 | 4.999 |
| d17 | 5.647 | 8.734 | 14.319 | 1.619 | 1.725 | 1.857 |
| d23 | 5.197 | 6.886 | 8.574 | 1.692 | 1.629 | 1.097 |
| d28 | 10.165 | 7.000 | 2.000 | 17.699 | 19.265 | 21.939 |

[Lens Group Data]

| | ST | f |
|---|---|---|
| G1 | 1 | 165.727 |
| G2 | 6 | −72.017 |
| G3 | 11 | 636.254 |
| Ga | 18 | 50.747 |
| Gb | 24 | 115.444 |
| Gr | 29 | −60.028 |

| | | f | |
|---|---|---|---|
| | ST | Wide Angle End | Telephoto End |
| Gm | 6 | −75.463 | −71.782 |

[Values for Conditional Expressions]

(1-1) |fa/fb| = 0.44
(1-2) |fa|/f1 = 0.31
(1-3) |fa|/(−fr) = 0.85
(1-4) Xat/D3a = 0.98
(2-1) |fa|/f1 = 0.31
(2-2) |fb|/f1 = 0.70
(2-3) |fa/fb| = 0.44
(2-4) |fa|/(−fr) = 0.85
(2-5) Xat/D3a = 0.98

Figure 10A:
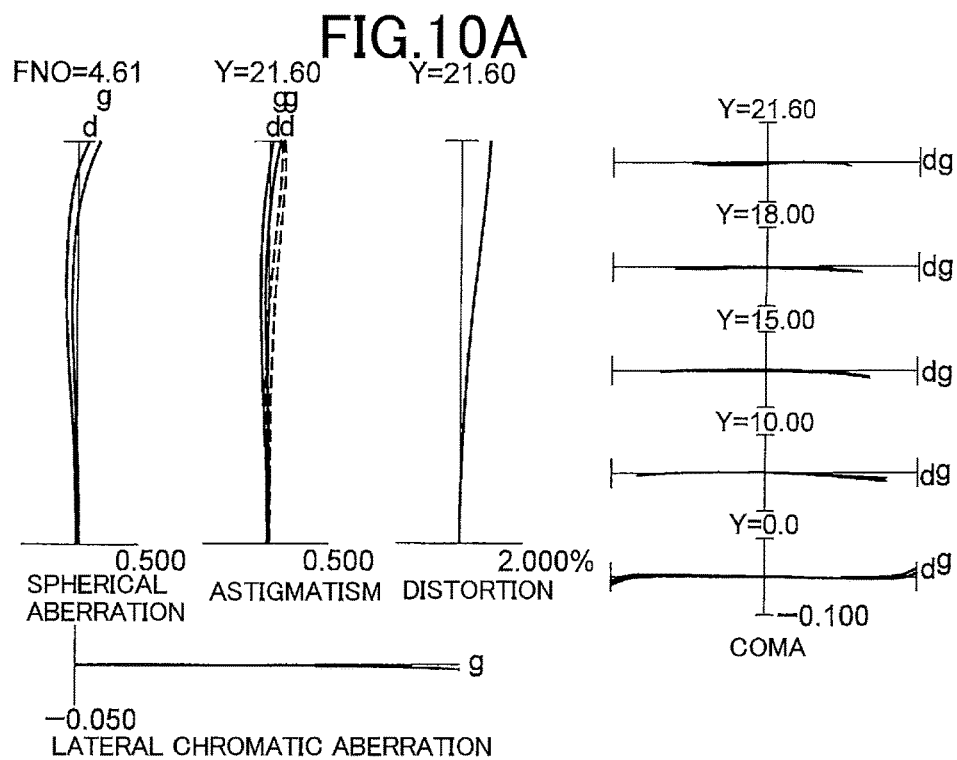
Figure 10B:
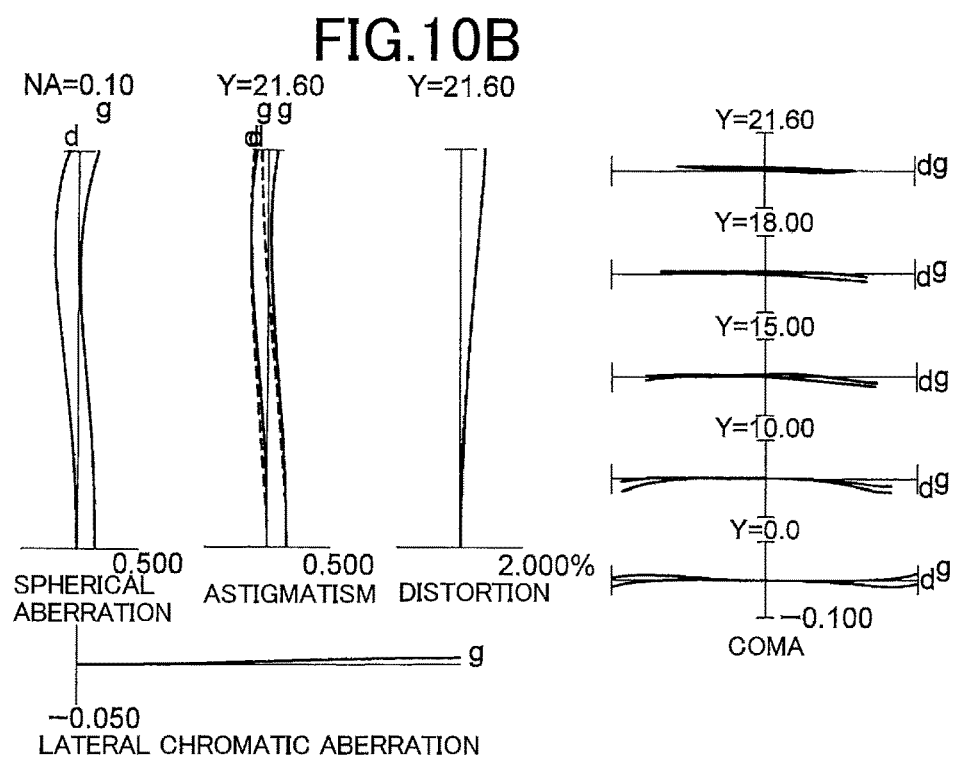

FIG. 10A is a graph showing various aberrations of the variable magnification optical system according to the Third Example upon focusing on an infinity in a wide angle end state, and FIG. 10B is a graph showing various aberrations of the variable magnification optical system according to the Third Example upon focusing on a close distance object in a wide angle end state.

Figure 11A:
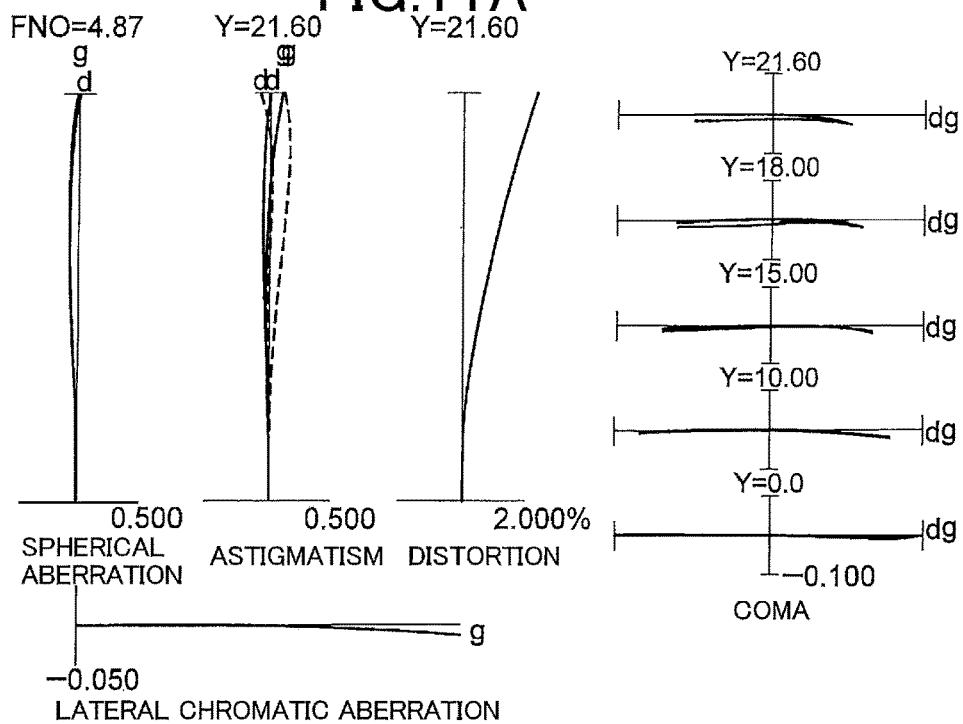
Figure 11B:
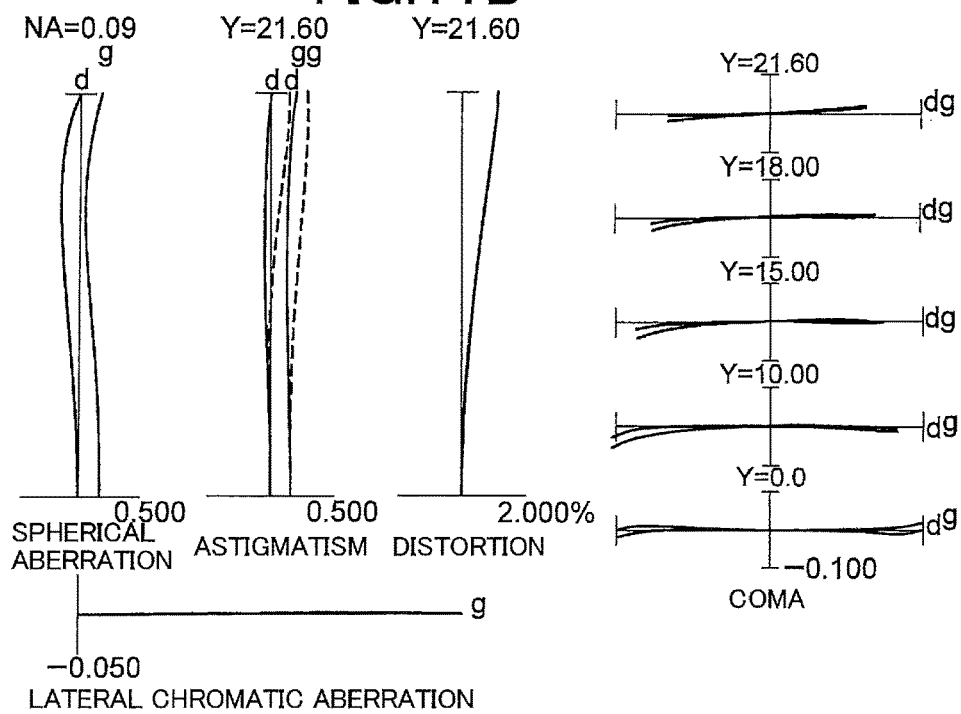

FIG. 11A is a graph showing various aberrations of the variable magnification optical system according to the Third Example upon focusing on an infinity in an intermediate focal length state, and FIG. 11B is a graph showing various aberrations of the variable magnification optical system according to the Third Example upon focusing on a close distance object in the intermediate focal length state.

Figure 12A:
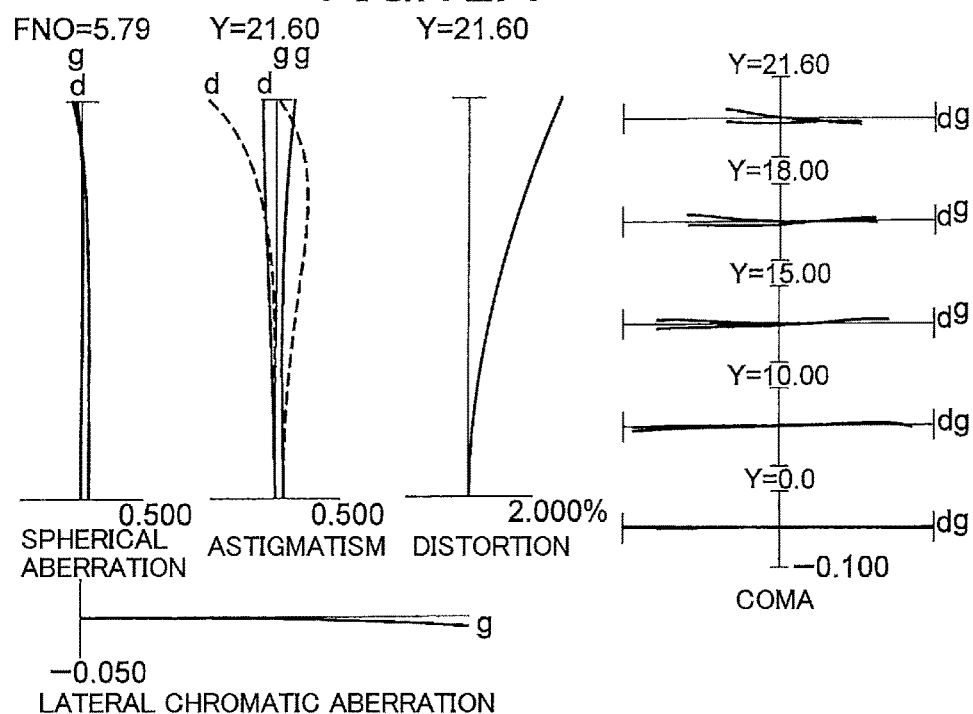
Figure 12B:
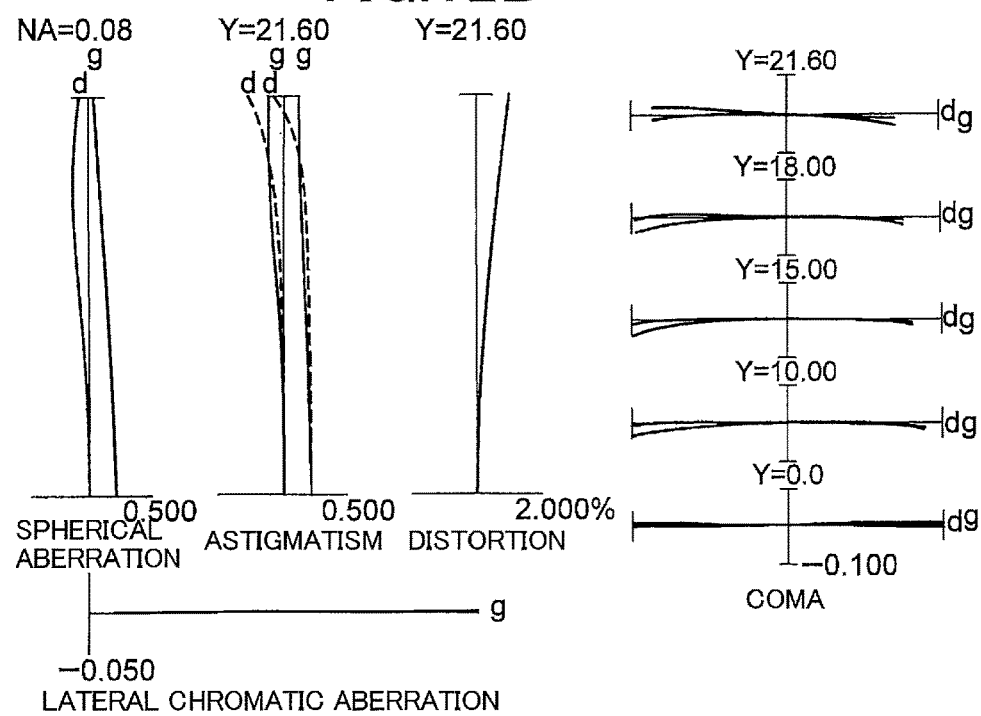

FIG. 12A is a graph showing various aberrations of the variable magnification optical system according to the Third Example upon focusing on an infinity in a telephoto end state, and FIG. 12B is a graph showing various aberrations of the variable magnification optical system according to the Third Example upon focusing on a close distance object in the telephoto end state.

As is apparent from the respective graphs, the variable magnification optical system according to the Third Example can correct excellently various aberrations from the wide angle end state to the telephoto end state and shows superb optical performance.

(Fourth Example)

FIG. 13 is a sectional view showing a lens configuration of a variable magnification optical system according to the Fourth Example which is common to the first embodiment and the second embodiment of the present application.

The variable magnification optical system according to the present Fourth Example is composed of, in order from an object side along the optical axis: a first lens group G1 having positive refractive power, an intermediate lens group Gm having negative refractive power, a first focusing lens group Ga having positive refractive power, a second focusing lens group Gb having positive refractive power and a rear lens group Gr having negative refractive power.

The first lens group G1 consists of, in order from the object side along the optical axis, a negative meniscus lens L11 having a convex surface facing the object side, a positive meniscus lens L12 having a convex surface facing the object side and a double convex positive lens L13.

The intermediate lens group Gm consists of, in order from the object side along the optical axis, a negative meniscus lens L21 having a convex surface facing the object side, a double concave negative lens L22, a double convex positive lens L23, a cemented lens constructed by a positive meniscus lens L24 having a concave surface facing the object side cemented with a double concave negative L25, and a negative meniscus lens L26 having a concave surface facing the object side.

The first focusing lens group Ga consists of, in order from the object side, a double convex positive lens L31 and a cemented lens constructed by a negative meniscus lens L32 having a convex surface facing the object side cemented with a double convex positive lens L33.

The second focusing lens group Gb consists of, in order from the object side, a negative meniscus lens L41 having a concave surface facing the object side, a double convex positive lens L42 and a positive meniscus lens L43 having a concave surface facing the object side.

The rear lens group Gr consists of, in order from the object side, a negative meniscus lens L51 having a convex surface facing the object side, a positive meniscus lens L52 having a convex surface facing the object side, and a negative meniscus lens L53 having a concave surface facing the object side.

In the variable magnification optical system according to the present Example, varying magnification from a wide-angle end state to a telephoto end state is conducted by moving each lens group toward the object side while varying an interval between the first lens group G1 and the intermediate lens group Gm, an interval between the intermediate lens group Gm and the first focusing lens group Ga, an interval between the first focusing lens group Ga and the second focusing lens group Gb and an interval between the second focusing lens group Gb and the rear lens group Gr.

In the variable magnification optical system according to the present Example, focusing from an infinite distance object to a close distance object is carried out by moving the first focusing lens group Ga toward the image side and also moving the second focusing lens group Gb toward the object side In the variable magnification optical system according to the present Example, vibration reduction is conducted by moving, as a vibration reducing lens, the negative lens L22 in the intermediate lens group Gm to have a component in a direction perpendicular to the optical axis.

In the present Example, the vibration reduction coefficient in the wide-angle end state is −1.000, and the moving amount of the vibration reducing lens group for correcting a rotational camera shake of 0.20 degrees is −0.279. Also, in the telephoto end state, the vibration reduction coefficient is −1.620, so the moving amount of the vibration reducing lens group for correcting a rotational camera shake of 0.10 degrees is −0.191.

Various values of the variable magnification optical system according to the present Fourth Example, are listed in Table 4 below.

TABLE 4

[Surface Data]

| m | r | d | nd | vd |
|---|---|---|---|---|
| OP | ∞ | ∞ | | |
| 1 | 67.047 | 1.809 | 1.84666 | 23.80 |
| 2 | 51.276 | 0.197 | | |
| 3 | 52.188 | 7.381 | 1.49782 | 82.57 |
| 4 | 256.459 | 0.100 | | |
| 5 | 105.571 | 5.077 | 1.48749 | 70.31 |
| 6 | −828.866 | d6 | | |
| 7 | 86.600 | 1.000 | 1.69680 | 55.52 |
| 8 | 29.932 | 9.019 | | |
| 9 | −51.861 | 1.000 | 1.45600 | 91.36 |
| 10 | 104.632 | 15.308 | | |
| 11 | 46.766 | 4.902 | 1.84666 | 23.80 |
| 12 | −113.685 | 5.507 | | |
| 13 | −70.862 | 7.420 | 1.45600 | 91.36 |
| 14 | −52.828 | 1.000 | 1.79504 | 28.69 |
| 15 | 329.341 | 2.504 | | |
| 16 | −34.709 | 1.000 | 1.90200 | 25.26 |
| 17 | −86.976 | d17 | | |
| 18 | ∞ | 1.000 | Aperture | stop S |
| 19 | 137.080 | 4.554 | 1.49782 | 82.57 |
| 20 | −47.877 | 1.999 | | |
| 21 | 67.075 | 3.927 | 1.95000 | 29.37 |
| 22 | 27.764 | 6.518 | 1.63930 | 44.83 |
| 23 | −137.693 | d23 | | |
| 24 | −35.058 | 1.000 | 1.68893 | 31.16 |
| 25 | −79.902 | 0.100 | | |
| 26 | 54.365 | 4.553 | 1.49782 | 82.57 |
| 27 | −247.547 | 8.100 | | |
| 28 | −106.325 | 2.409 | 1.90265 | 35.72 |
| 29 | −58.138 | d29 | | |
| 30 | 97.294 | 2.000 | 1.85026 | 32.35 |
| 31 | 18.103 | 8.420 | 1.78472 | 25.64 |
| 32 | 1118.256 | 3.259 | | |
| 33 | −34.479 | 2.000 | 1.90366 | 31.27 |
| 34 | −96.844 | Bf | | |
| I | ∞ | | | |

[Various Data]

f = 79.99 − 177.00
FNO = 4.53 − 5.83
ω = 14.99 − 6.75
Y = 21.60
TL = 196.26 − 247.37
Bf = 39.00 − 57.44

[Variable Distance Data]

| | Infinity | | | Close Distance (shooting distance 0.33 m) | | |
|---|---|---|---|---|---|---|
| | W | M | T | W | M | T |
| d0 | ∞ | ∞ | ∞ | 122.62 | 104.02 | 82.62 |
| d6 | 2.000 | 13.570 | 27.236 | 2.000 | 13.570 | 27.236 |

TABLE 4-continued

| d17 | 11.236 | 6.984 | 1.000 | 19.842 | 18.210 | 17.476 |
|---|---|---|---|---|---|---|
| d23 | 24.332 | 30.545 | 41.997 | 7.120 | 6.970 | 6.572 |
| d29 | 17.732 | 13.430 | 6.624 | 26.338 | 25.778 | 25.572 |

[Lens Group Data]

| | ST | f |
|---|---|---|
| G1 | 1 | 112.820 |
| Gm | 7 | −27.033 |
| Ga | 19 | 47.001 |
| Gb | 24 | 129.999 |
| Gr | 30 | −87.823 |

[Values for Conditional Expressions]

(1-1) |fa/fb| = 0.36
(1-2) |fa|/f1 = 0.42
(1-3) |fa|/(−fr) = 0.54
(1-4) Xat/D3a = 0.97
(2-1) |fa|/f1 = 0.42
(2-2) |fb|/f1 = 1.15
(2-3) |fa/fb| = 0.36
(2-4) |fa|/(−fr) = 0.54
(2-5) Xat/D3a = 0.97

FIG. 14A is a graph showing various aberrations of the variable magnification optical system according to the Fourth Example upon focusing on an infinity in a wide angle end state, and FIG. 14B is a graph showing various aberrations of the variable magnification optical system according to the Fourth Example upon focusing on a close distance object in the wide angle end state.

Figure 15A:
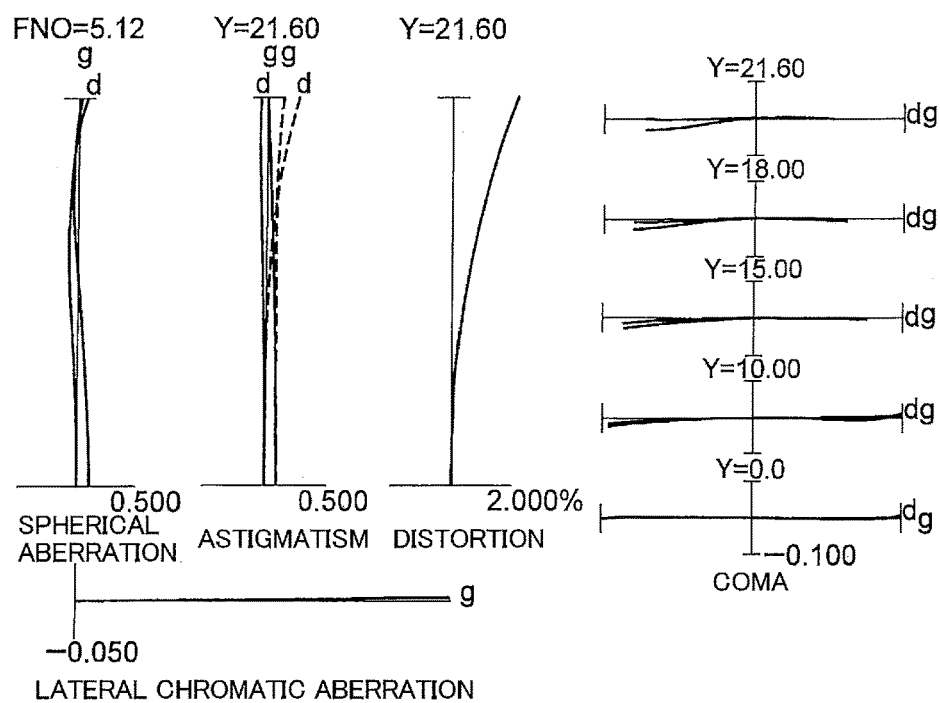
Figure 15B:
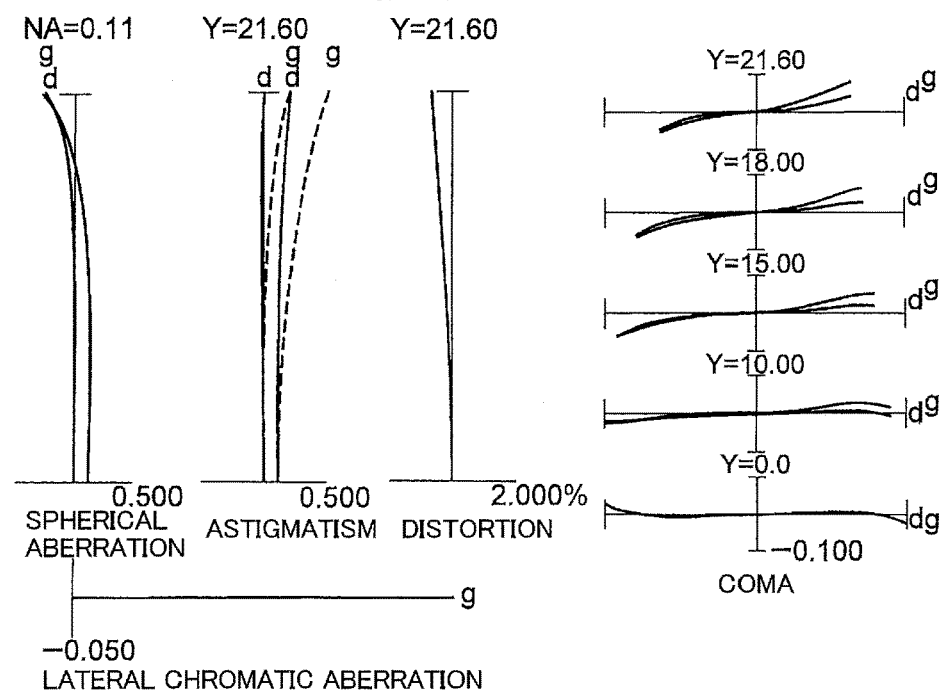

FIG. 15A is a graph showing various aberrations of the variable magnification optical system according to the Fourth Example upon focusing on an infinity in an intermediate focal length state, and FIG. 15B is a graph showing various aberrations of the variable magnification optical system according to the Fourth Example upon focusing on a close distance object in the intermediate focal length state.

Figure 16A:
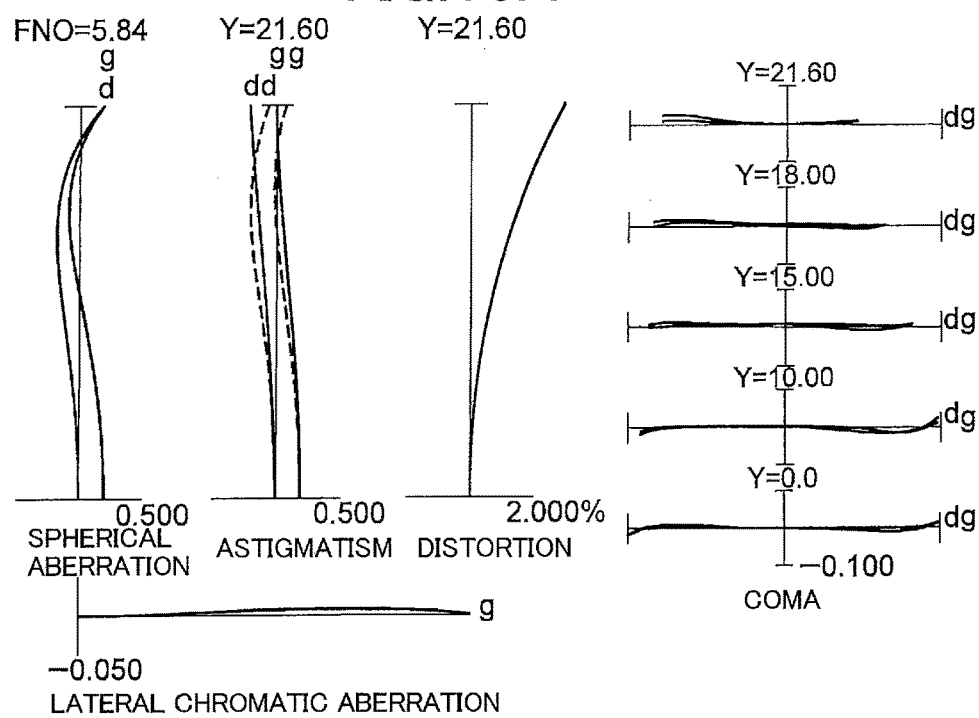
Figure 16B:
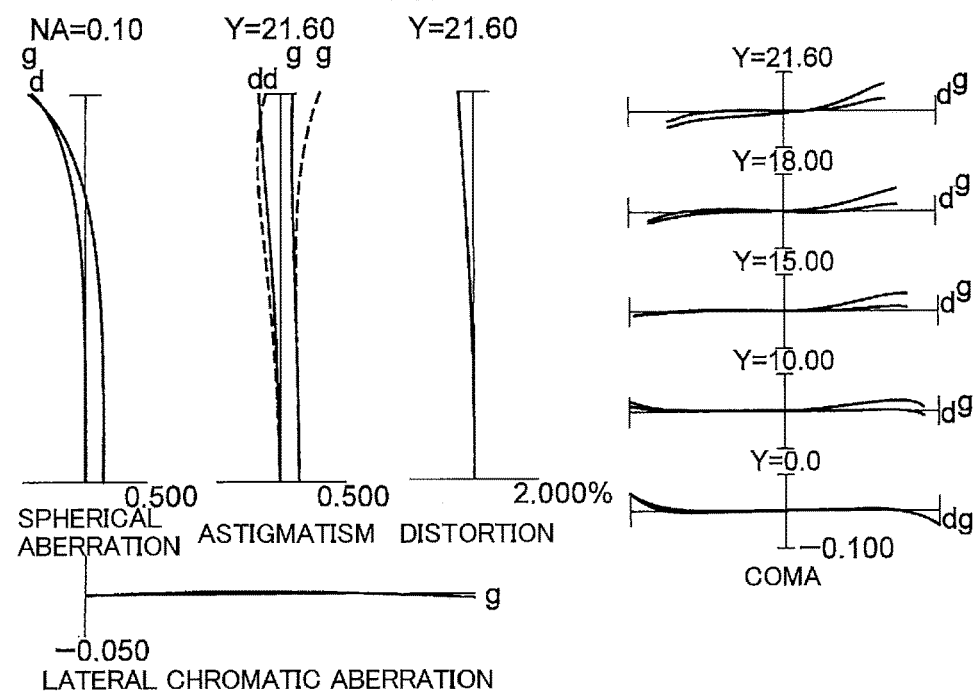

FIG. 16A is a graph showing various aberrations of the variable magnification optical system according to the Fourth Example upon focusing on an infinity in a telephoto end state, and FIG. 16B is a graph showing various aberrations of the variable magnification optical system according to the Fourth Example upon focusing on a close distance object in the telephoto end state.

As is apparent from the respective graphs, the variable magnification optical system according to the Fourth Example can correct excellently various aberrations from the wide angle end state to the telephoto end state and shows superb optical performance.

(Fifth Example)

Figure 17:
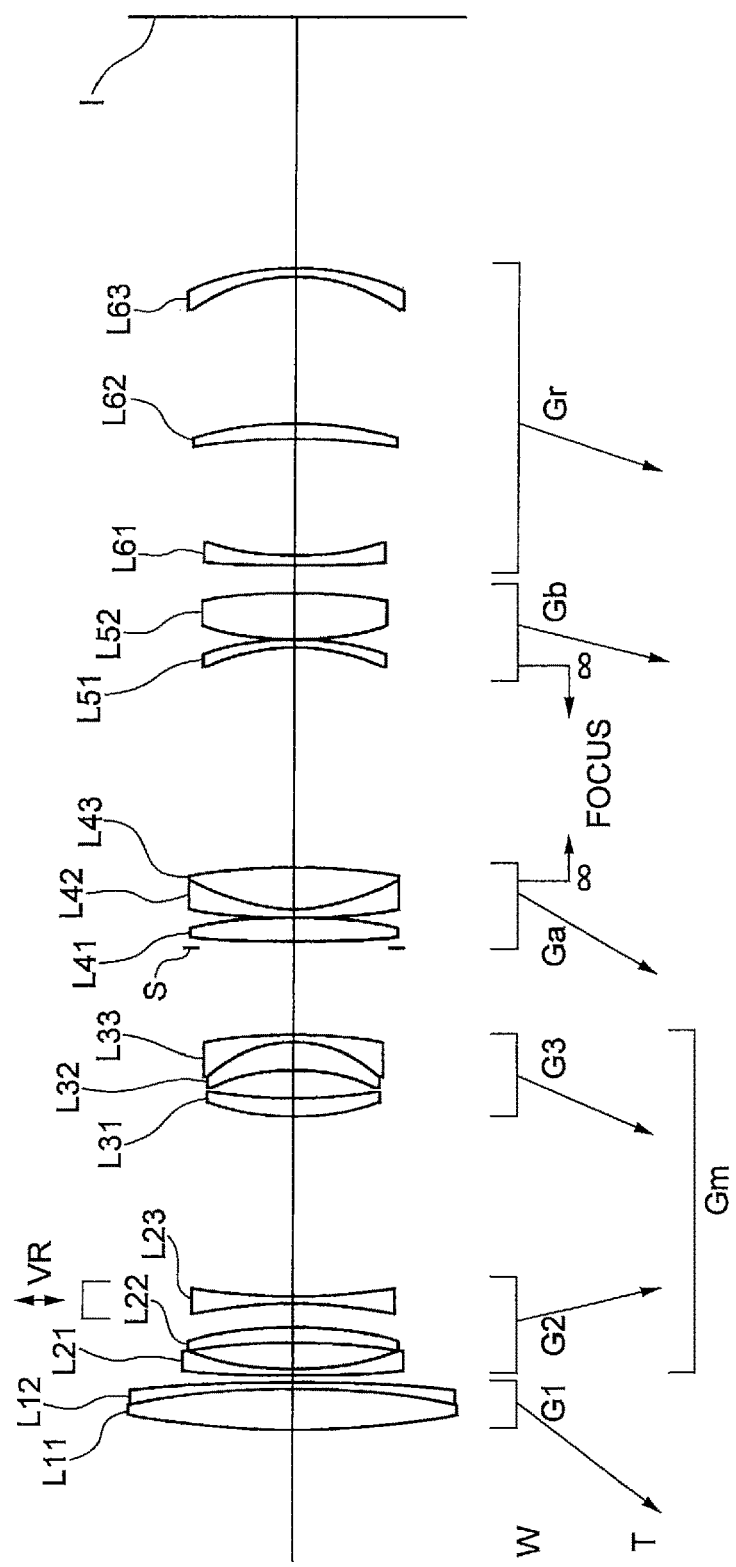
FIG. 17 is a sectional view showing a lens configuration of a variable magnification optical system according to a Fifth Example that is common to the first embodiment and the second embodiment of the present application.

FIG. 17 is a sectional view showing a lens configuration of a variable magnification optical system according to the Fifth Example which is common to the first embodiment and the second embodiment of the present application.

The variable magnification optical system according to the present Fifth Example is composed of, in order from an object side along the optical axis: a first lens group G1 having positive refractive power, an intermediate lens group Gm having negative refractive power, a first focusing lens group Ga having positive refractive power, a second focusing lens group Gb having positive refractive power and a rear lens group Gr having negative refractive power.

The first lens group G1 consists of, in order from the object side along the optical axis, a cemented lens constructed by a double convex positive lens L11 cemented with a negative meniscus lens L12 having a concave surface facing the object side.

The intermediate lens group Gm consists of, in order from the object side along the optical axis, a second lens group G2 having negative refractive power and a third lens group G3 having negative refractive power. The second lens group G2 consists of, in order from the object side, a negative meniscus lens L21 having a convex surface facing the object side, a positive meniscus lens L22 having a concave surface facing the object side and a double concave negative lens L23. The third lens group G3 consists of, in order from the object side, a positive meniscus lens L31 having a convex surface facing the object side and a cemented lens constructed by a positive meniscus lens L32 having a concave surface facing the object side cemented with a negative meniscus lens L33 having a concave surface facing the object side.

The first focusing lens group Ga consists of, in order from the object side, a double convex positive lens L41 and a cemented lens constructed by a negative meniscus lens L42 having a convex surface facing the object side cemented with a double convex positive lens L43.

The second focusing lens group Gb consists of, in order from the object side, a negative meniscus lens L51 having a concave surface facing the object side, and a double convex positive lens L52.

The rear group Gr consists of, in order from the object side, a negative meniscus lens L61 having a convex surface facing the object side, a positive meniscus lens L62 having a concave surface facing the object side, and a negative meniscus lens L63 having a concave surface facing the object side.

In the variable magnification optical system according to the present Example, varying magnification from a wide-angle end state to a telephoto end state is conducted by moving each lens group while varying an interval between the first lens group G1 and the second lens group G2, an interval between the second lens group G2 and the third lens group G3, an interval between the third lens group G3 and the first focusing lens group Ga, an interval between the first focusing lens group Ga and the second focusing lens group Gb and an interval between the second focusing lens group Gb and the rear lens group Gr. At this time, the first lens group G1, the third lens group G3, the first focusing lens group Ga, the second focusing lens group Gb and the rear lens group Gr are moved toward the object side, and the second lens group G2 is moved toward the image side.

In the variable magnification optical system according to the present Example, focusing from an infinite distance object to a close distance object is carried out by moving the first focusing lens group Ga toward the image side and also moving the second focusing lens group Gb toward the object side.

Further, in the variable magnification optical system according to the present Example, vibration reduction is conducted by moving, as a vibration reducing lens, the negative lens L23 in the second lens group G2 to have a component in a direction perpendicular to the optical axis.

In the present example, the vibration reduction coefficient in the wide angle end state is −0.861, so the moving amount of the vibration reduction lens group for correcting a rotational camera shake of 0.20 degrees is −0.324. Further, the vibration reduction coefficient in the telephoto end state is −1.446, so the moving amount of the vibration reduction lens group for correcting a rotational camera shake of 0.10 degrees is −0.232.

Various values of the variable magnification optical system according to the present Fifth Example, are listed in Table 5 below.

TABLE 5

[Surface Data]

| m | r | d | nd | vd |
|---|---|---|---|---|
| OP | ∞ | ∞ | | |
| 1 | 143.937 | 6.708 | 1.59319 | 67.90 |
| 2 | −137.270 | 1.000 | 1.95000 | 29.37 |
| 3 | −264.285 | d3 | | |
| 4 | 239.979 | 1.000 | 1.60300 | 65.44 |
| 5 | 50.245 | 4.246 | | |
| 6 | −107.498 | 2.354 | 1.84666 | 23.80 |
| 7 | −65.315 | 3.811 | | |
| 8 | −76.469 | 1.000 | 1.49782 | 82.57 |
| 9 | 117.781 | d9 | | |
| 10 | 42.193 | 2.805 | 1.75520 | 27.57 |
| 11 | 82.774 | 4.486 | | |
| 12 | −33.017 | 4.297 | 1.90200 | 25.26 |
| 13 | −20.221 | 1.000 | 1.79504 | 28.69 |
| 14 | −89.946 | d14 | | |
| 15 | ∞ | 1.000 | Aperture | stop S |
| 16 | 174.374 | 3.800 | 1.78590 | 44.17 |
| 17 | −83.187 | 0.100 | | |
| 18 | 122.688 | 1.000 | 1.83400 | 37.18 |
| 19 | 31.155 | 6.647 | 1.49782 | 82.57 |
| 20 | −109.319 | d20 | | |
| 21 | −35.609 | 1.199 | 1.74077 | 27.74 |
| 22 | −49.798 | 0.100 | | |
| 23 | 52.926 | 7.000 | 1.59319 | 67.90 |
| 24 | −96.479 | d24 | | |
| 25 | 210.716 | 1.500 | 1.72000 | 43.61 |
| 26 | 47.500 | 18.107 | | |
| 27 | −105.559 | 2.401 | 1.84666 | 23.80 |
| 28 | −60.905 | 22.750 | | |
| 29 | −27.590 | 1.499 | 1.45600 | 91.36 |
| 30 | −43.138 | Bf | | |
| I | ∞ | | | |

[Various Data]

f = 80.00 − 192.00
FNO = 4.10 − 5.87
ω = 14.93 − 6.23
Y = 21.60
TL = 219.90 − 259.90
Bf = 39.00 − 55.04

[Variable Distance Data]

| | Infinity | | | Close Distance (shooting distance 0.35 m) | | |
|---|---|---|---|---|---|---|
| | W | M | T | W | M | T |
| d0 | ∞ | ∞ | ∞ | 130.09 | 109.27 | 90.09 |
| d3 | 1.000 | 28.322 | 55.644 | 1.000 | 28.322 | 55.644 |
| d9 | 28.090 | 14.545 | 1.000 | 28.090 | 14.545 | 1.000 |
| d14 | 13.553 | 7.776 | 1.000 | 22.470 | 21.004 | 19.905 |
| d20 | 34.099 | 37.465 | 43.442 | 17.336 | 12.330 | 4.685 |
| d24 | 4.338 | 4.145 | 3.952 | 12.185 | 16.051 | 23.803 |

[Lens Group Data]

| | ST | f |
|---|---|---|
| G1 | 1 | 196.221 |
| G2 | 4 | −64.607 |
| G3 | 10 | −375.475 |
| Ga | 16 | 70.000 |
| Gb | 21 | 85.121 |
| Gr | 25 | −84.381 |

TABLE 5-continued

| | | f | |
|---|---|---|---|
| ST | | Wide Angle End | Telephoto End |
| Gm | 4 | −49.185 | −52.044 |

[Values for Conditional Expressions]

(1-1) |fa/fb| = 0.82
(1-2) |fa|/f1 = 0.36
(1-3) |fa|/(−fr) = 0.83
(1-4) Xat/D3a = 1.64
(2-1) |fa|/f1 = 0.36
(2-2) |fb|/f1 = 0.43
(2-3) |fa/fb| = 0.82
(2-4) |fa|/(−fr) = 0.83
(2-5) Xat/D3a = 1.64

Figure 18A:
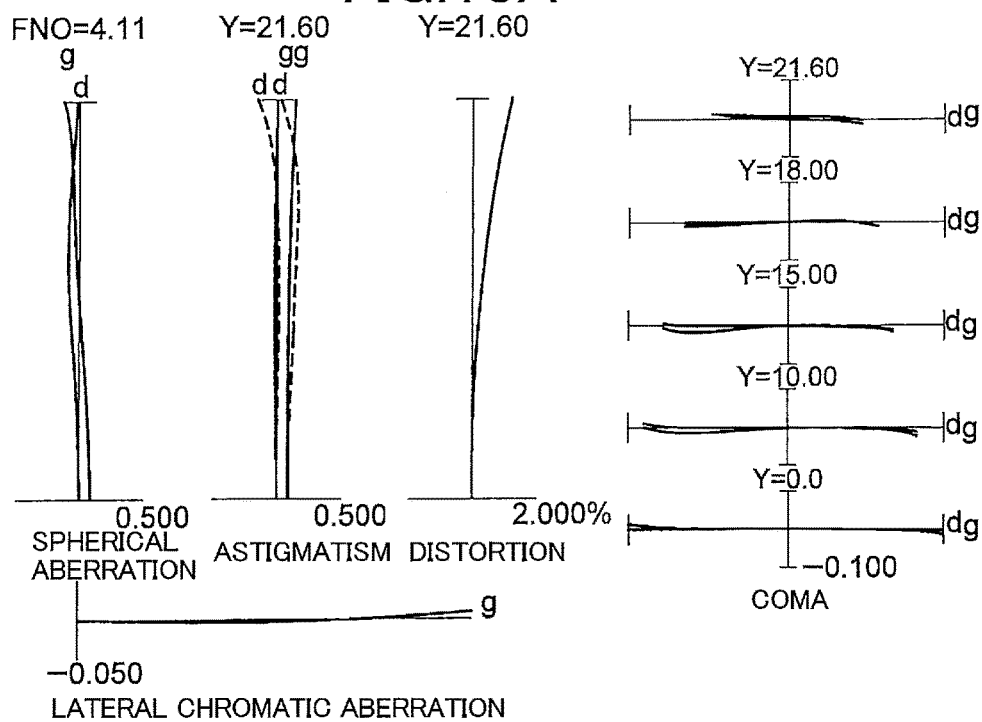
Figure 18B:
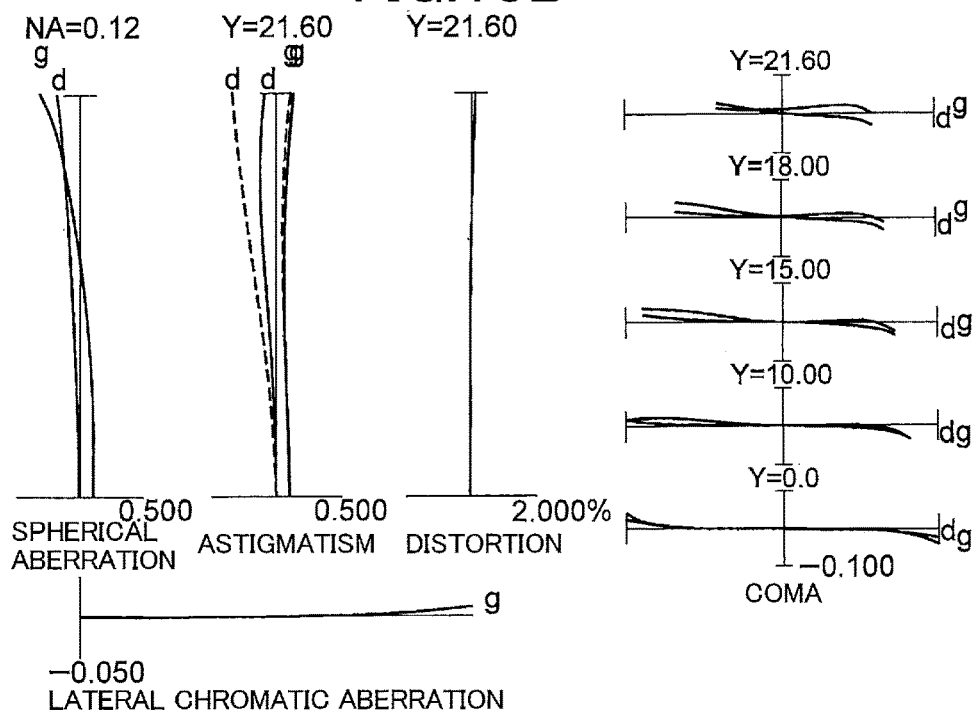

FIG. 18A is a graph showing various aberrations of the variable magnification optical system according to the Fifth Example upon focusing on an infinity in a wide angle end state, and FIG. 18B is a graph showing various aberrations of the variable magnification optical system according to the Fifth Example upon focusing on a close distance object in the wide angle end state.

Figure 19A:
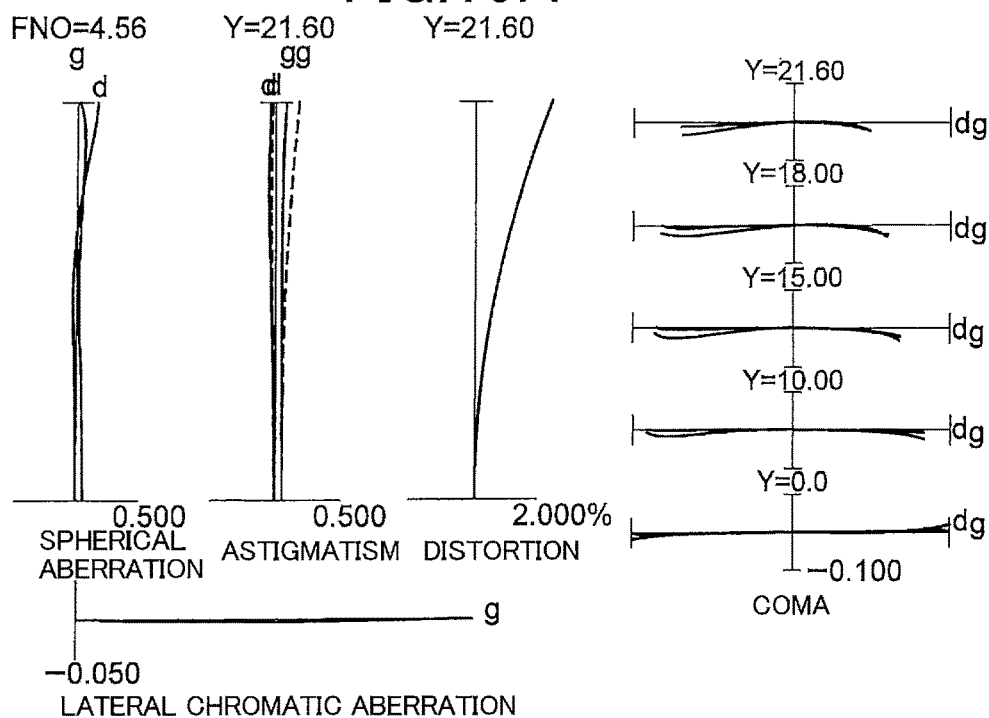
Figure 19B:
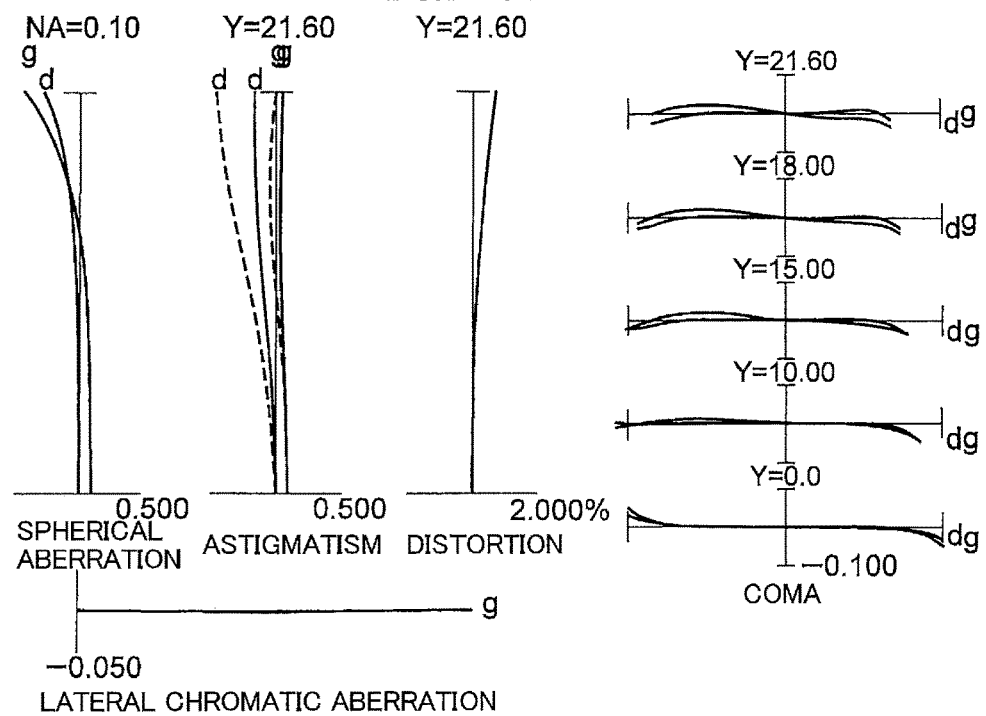

FIG. 19A is a graph showing various aberrations of the variable magnification optical system according to the Fifth Example upon focusing on an infinity in an intermediate focal length state, and FIG. 19B is a graph showing various aberrations of the variable magnification optical system according to the Fifth Example upon focusing on a close distance object in the intermediate focal length state.

Figure 20A:
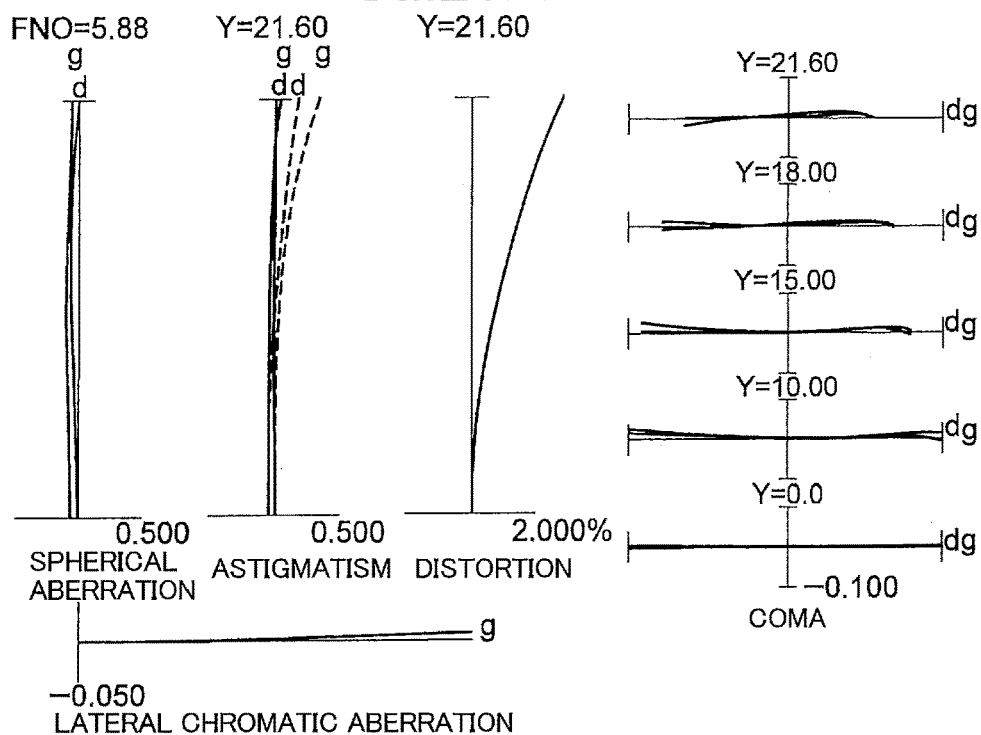
Figure 20B:
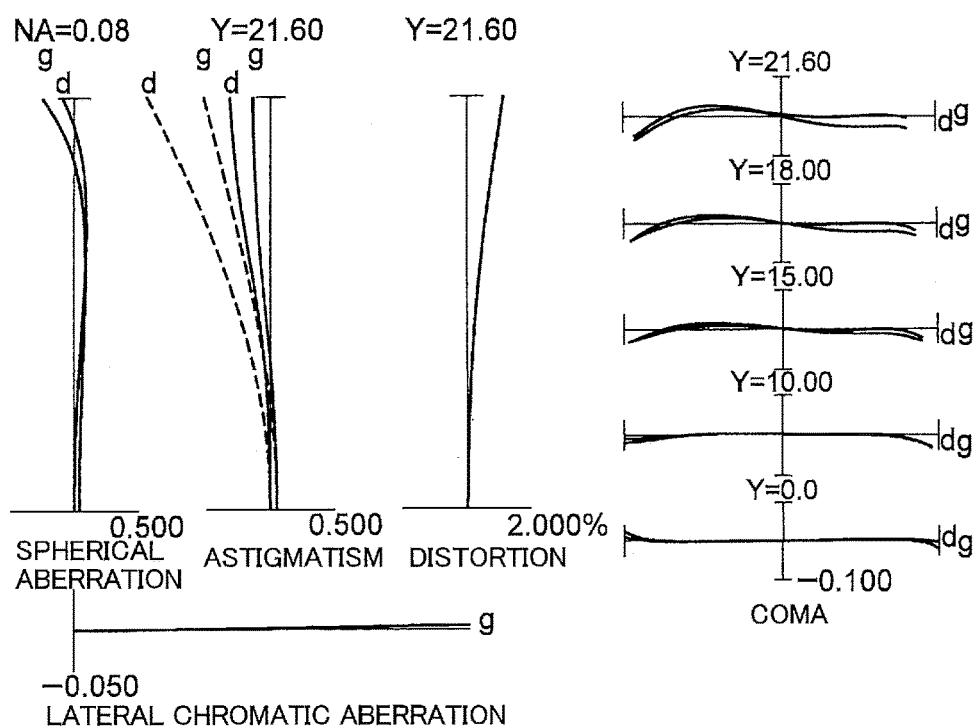

FIG. 20A is a graph showing various aberrations of the variable magnification optical system according to the Fifth Example upon focusing on an infinity in a telephoto end state, and FIG. 20B is a graph showing various aberrations of the variable magnification optical system according to the Fifth Example upon focusing on a close distance object in the telephoto end state.

As is apparent from the respective graphs, the variable magnification optical system according to the Fifth Example can correct excellently various aberrations from the wide angle end state to the telephoto end state and shows superb optical performance.

Incidentally, each of the above described Examples is a concrete example of the invention of the present application, and the invention of the present application is not limited to them. The contents described below can be adopted properly without deteriorating an optical performance of the variable magnification optical systems of the present application.

Although the variable magnification optical systems having five group configuration and six group configuration were illustrated above as numerical examples of the variable magnification optical systems of the present application, the present application is not limited to them and the variable magnification optical systems having other configurations (such as seven group configuration, eight group configuration and the like) can be configured. Concretely, a lens configuration that a lens or a lens group is added to the most object side of the variable magnification optical system of the present application is possible, and a lens configuration that a lens or a lens group is added to the most image side of the variable magnification optical system of the present application is also possible. Moreover, the rear lens group may be two lens groups composed of a lens group having positive refractive power and a lens group having negative refractive power, or composed of a lens group having negative refractive power and a lens group having negative refractive power. Meanwhile, a lens group indicates parts including at least one lens, separated by air spaces being variable upon varying magnification.

Further, the variable magnification optical system of the present application may have such a configuration that, for focusing from an infinite distance object to a close distance object, a portion of a lens group, a single lens group in the entirety thereof, or a plurality of lens groups can be moved in the direction of the optical axis as a focusing lens group. It is particularly preferable that the variable magnification optical system of the present application comprises the first focusing lens group and the second focusing lens group as described above and is so configured that the first focusing lens group and the second focusing lens group are moved along the optical axis with differing trajectories from each other. Further, the focusing lens group can be used for auto focus, and suitable for being driven by a motor for auto focus such as an ultrasonic motor.

Further, in the variable magnification optical systems of the present application, any lens group in the entirety thereof or a portion thereof can be so moved, as a vibration reduction lens group, to have a component in a direction perpendicular to the optical axis, or rotationally moved (swayed) in an intra-plane direction including the optical axis for correcting an image blur caused by a camera shake. Particularly, in the variable magnification optical systems of the present application, it is preferable that at least a portion of the intermediate lens group is used as a vibration reduction lens group.

Further, in the variable magnification optical systems of the present application, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by errors in lens processing, assembling and adjustment, so that it is preferable. Moreover, even if an image plane is shifted, deterioration in representation performance is little, so that it is preferable. When a lens surface is an aspherical surface, the aspherical surface may be fabricated by a grinding process, a glass molding process that a glass material is formed into an aspherical shape by a mold, or a compound type process that a resin material on a glass lens surface is formed into an aspherical shape. A lens surface may be a diffractive optical surface, and a lens may be a graded-index type lens (GRIN lens) or a plastic lens.

Further, in the variable magnification optical systems of the present application, it is preferable that an aperture stop S is disposed at the object side of the first focusing lens group or in the vicinity thereof, and the function of the aperture stop may be substituted by a lens frame without disposing a member as an aperture stop.

Moreover, the lens surface(s) of the lenses configuring the variable magnification optical systems of the present application may be coated with anti-reflection coating(s) having a high transmittance in a broad wavelength range. With this contrivance, it is feasible to reduce a flare as well as ghost and attain a high optical performance with high contrast.

Meanwhile, in the variable magnification optical systems of the present application, a 35 mm equivalent focal length is on the order of 60-80 mm in a wide angle end state and the 35 mm equivalent focal length is on the order of 150-200 mm in a telephoto end state. Further, in the variable magnification optical systems of the present application, the variable magnification ratio is on the order of 1.5 to 4. Furthermore, in the variable magnification optical systems of the present application, a maximum shooting magnification in any focal length state is equal to or exceeds −0.5 and is equal to or falls below −1.0, and a close distance shooting and varying magnification are compatible.

Next, a camera equipped with the variable magnification optical system of the present application, will be explained with referring to FIG. 21.

Figure 21:
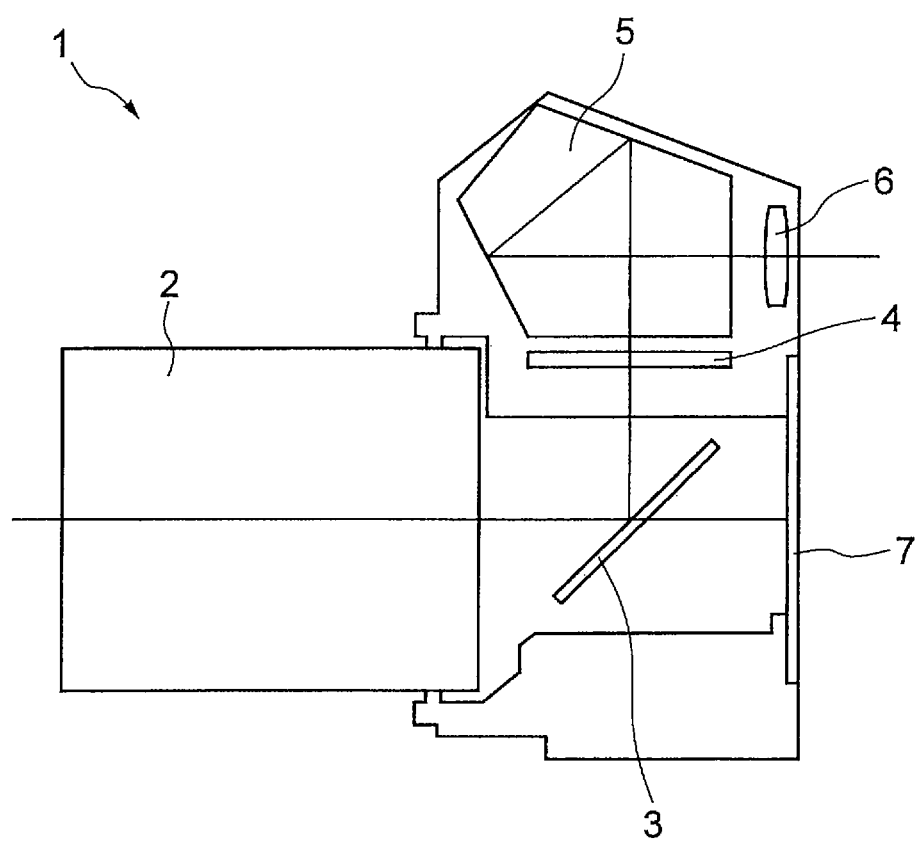
FIG. 21 is a diagram showing a cross-section of a single lens reflex camera equipped with the variable magnification optical system according to the First Example of the present application.

FIG. 21 is a view showing a configuration of a camera equipped with the variable magnification optical system of the present application.

The present camera 1 is a single lens reflex type digital camera equipped with the variable magnification optical system according to the first Example as an imaging lens 2.

In the present camera 1, light emitted from an unillustrated object (an object to be imaged) is converged by the imaging lens 2, and forms an image of the object to be imaged, through a quick-return mirror 3, on a focusing plate 4. The light focused on the focusing plate 4 is guided, after reflected a plurality of times in a pentagonal prism 5, to an eyepiece 6. Thus, a photographer can observe the object image through the eye piece 6 as an elected image.

When the photographer presses an unillustrated release button, the quick return mirror 3 is withdrawn out of the optical path, and the light from the unillustrated object is guided to an imaging device 7. Thus, the light from the object is imaged on the imaging device 7 and is stored in an unillustrated memory. Thus, the photographer can take a picture of the object to be imaged by the camera 1.

The variable magnification optical system according to the First Example mounted on the camera 1 as the imaging lens 2 can suppress variation in aberrations caused by varying magnification and has a superb optical performance, as described above. Accordingly, the camera 1 mounted thereon with the variable magnification optical system according to the First Example as the imaging lens 2, can suppress variation in aberrations caused by varying magnification and realize a superb optical performance. Incidentally, even if the camera is so composed that the variable magnification optical system according to any one of the Second Example, the Third Example, the Fourth Example and the Fifth Example is mounted on the camera as the imaging lens 2, the same effect can be attained as the camera 1.

Next, an outline of a method for manufacturing a variable magnification optical system according to the first embodiment of the present application will be described with referring to FIG. 22.

Figure 22:
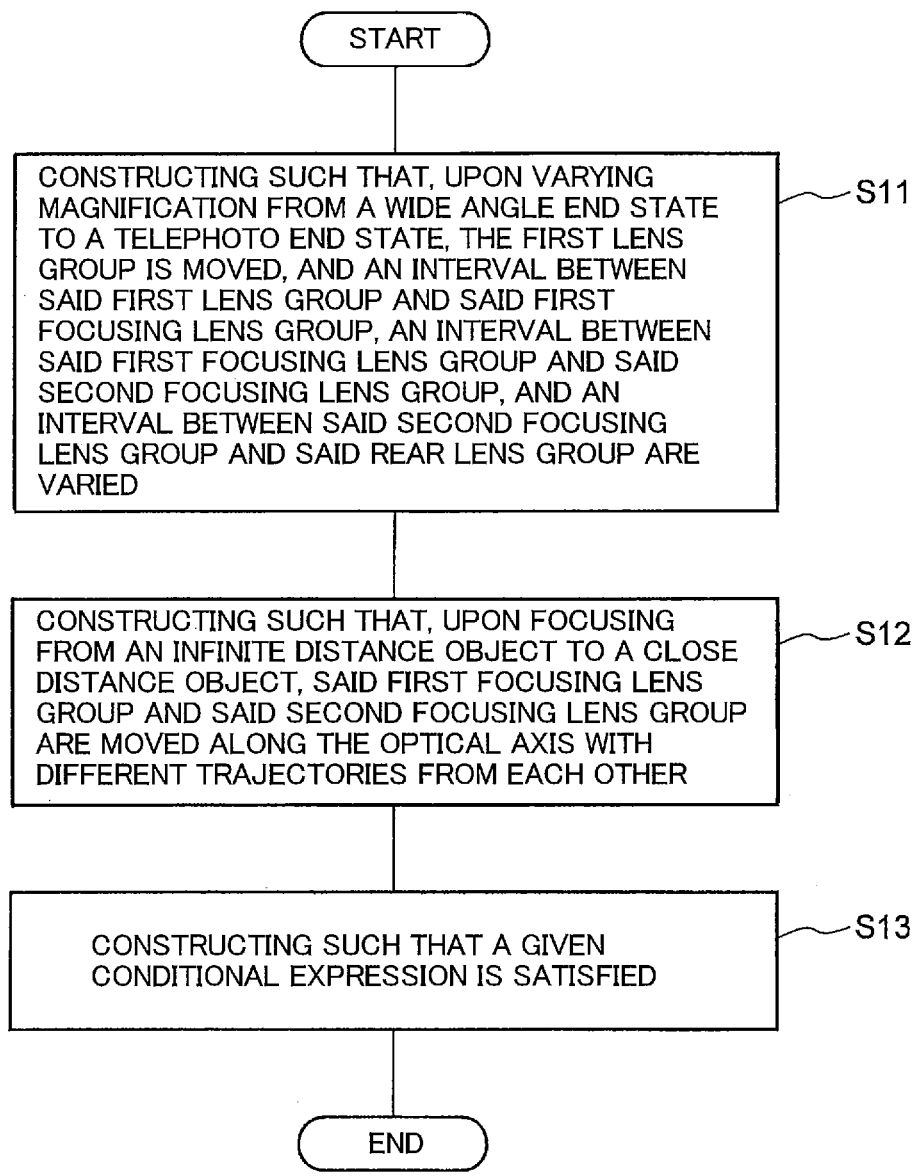
FIG. 22 is a flowchart schematically showing a method for manufacturing the variable magnification optical system according to the first embodiment of the present application.

The method for manufacturing a variable magnification optical system according to the first embodiment of the present application, shown in FIG. 22 is a method for manufacturing a variable magnification optical system which comprises, in order from an object side, a first lens group having positive refractive power, an intermediate lens group having negative refractive power, a first focusing lens group having positive refractive power, a second focusing lens group having positive refractive power and a rear lens group having negative refractive power, the method comprising the following steps of S11 to S13:

Step S11: constructing such that, upon varying magnification, the first lens group is moved, and an interval between said first lens group and said first focusing lens group, an interval between said first focusing lens group and said second focusing lens group, and an interval between said second focusing lens group and said rear lens group are varied;

Step S12: constructing such that, upon focusing from an infinite distance object to a close distance object, said first focusing lens group and said second focusing lens group are moved along the optical axis with different trajectories from each other; and constructing such that the following conditional expression (1-1) is satisfied:

$$0.30<|fa/fb|<0.90 \qquad (1\text{-}1)$$

where fa denotes a focal length of said first focusing lens group, and fb denotes a focal length of said second focusing lens group.

According to the above described method, it is possible to manufacture a variable magnification optical system which can suppress variation in aberrations caused by varying magnification and which has a high optical performance.

Finally, an outline of a method for manufacturing a variable magnification optical system according to the second embodiment of the present application will be described with referring to FIG. 23.

Figure 23:
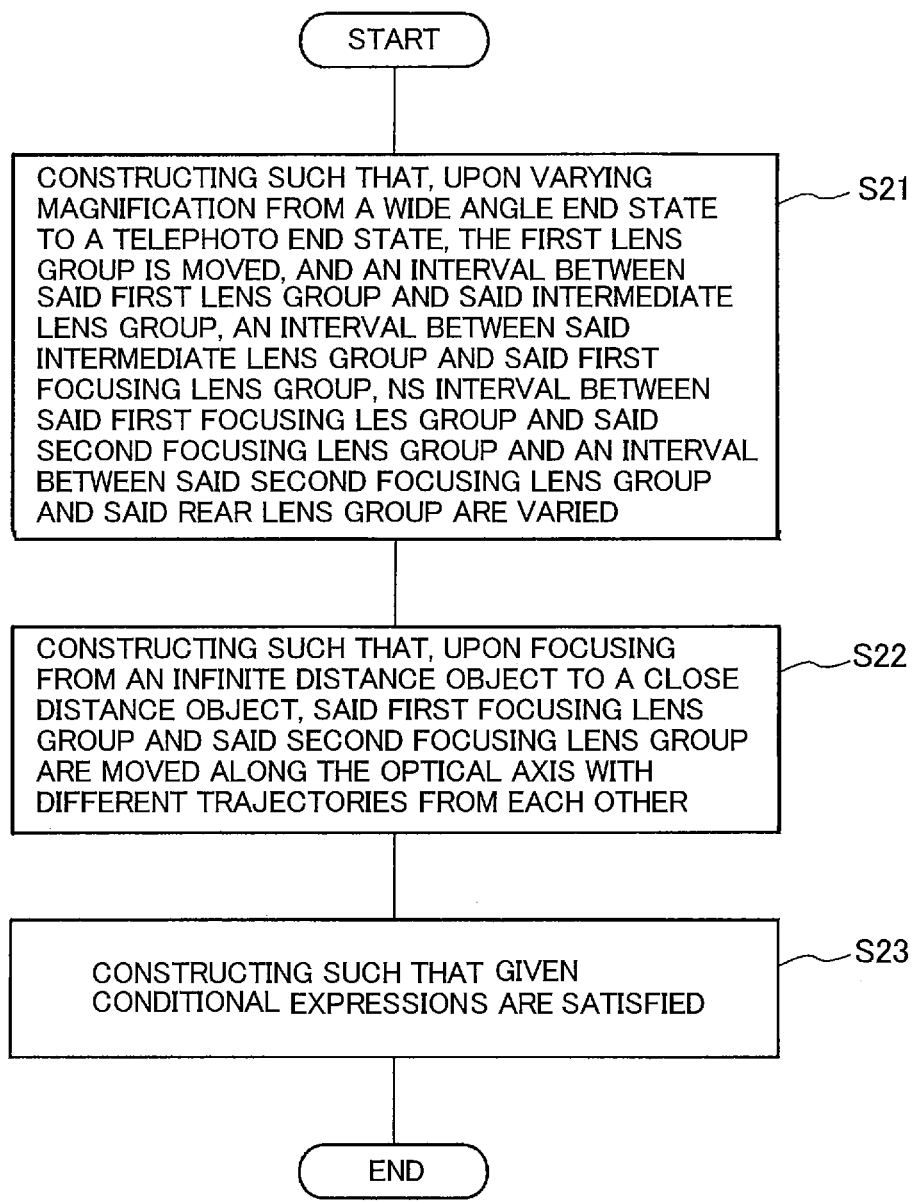
FIG. 23 is a flowchart schematically showing a method for manufacturing the variable magnification optical system according to the second embodiment of the present application.

The method for manufacturing a variable magnification optical system according to the second embodiment of the present application, shown in FIG. 23 is a method for manufacturing a magnification optical system which comprises, in order from an object side, a first lens group having positive refractive power, an intermediate lens group having negative refractive power, a first focusing lens group having positive refractive power, a second focusing lens group having positive refractive power and a rear lens group having negative refractive power;

the method comprising the following steps S21 to S23:

Step S21: constructing such that, upon varying magnification from a wide angle end state to a telephoto end state, the first lens group is moved, and an interval between said first lens group and said intermediate lens group, an interval between said intermediate lens group and said first focusing lens group, an interval between said first focusing lens group and said second focusing lens group and an interval between said second focusing lens group and said rear lens group are varied;

Step S22: constructing such that, upon focusing from an infinite distance object to a close distance object, said first focusing lens group and said second focusing lens group are moved along the optical axis with different trajectories from each other; and constructing such that, the following conditional expressions (2-1) and (2-2) are satisfied:

$$0.15<|fa|/f1<0.65 \qquad (2\text{-}1)$$

$$0.15<|fb|/f1<2.50 \qquad (2\text{-}2)$$

where fa denotes a focal length of said first focusing lens group, fb denotes a focal length of said second focusing lens group, and f1 denotes a focal length of said first lens group.

According to the above described method, it is possible to manufacture a variable magnification optical system which can suppress variation in aberrations caused by varying magnification and which has a high optical performance.

EXPLANATION ON SYMBOLS

G1 first lens group
G2 second lens group
G3 third lens group
Ga first focusing lens group
Gb second focusing lens group
Gm intermediate lens group
Gr rear lens group
I image plane S aperture stop
1 camera
2 imaging lens
3 quick return mirror
4 focusing plate
5 pentagonal prism
6 eyepiece
7 imaging device

What is claimed is:

1. A variable magnification optical system comprising:
a first lens group disposed at a most object side,
a first focusing lens group disposed at an image side of the first lens group,
a second focusing lens group disposed at an image side of the first focusing lens group, and
a rear lens group disposed at an image side of the second focusing lens group;
upon varying magnification, the first lens group being moved, and an interval between said first lens group and said first focusing lens group, an interval between said first focusing lens group and said second focusing lens group, and an interval between said second focusing lens group and said rear lens group being varied;
upon focusing, said first focusing lens group and said second focusing lens group being moved along the optical axis with different trajectories from each other; and
the following conditional expression being satisfied:

$$0.30 < |fa/fb| < 0.90$$

where fa denotes a focal length of said first focusing lens group, and fb denotes a focal length of said second focusing lens group.

2. A variable magnification optical system comprising:
a first lens group disposed at a most object side,
a first focusing lens group disposed at an image side of the first lens group,
a second focusing lens group disposed at an image side of the first focusing lens group, and
a rear lens group disposed at an image side of the second focusing lens group;
upon varying magnification, the first lens group being moved, and an interval between said first lens group and said first focusing lens group, an interval between said first focusing lens group and said second focusing lens group, and an interval between said second focusing lens group and said rear lens group being varied;
upon focusing, said first focusing lens group and said second focusing lens group being moved along the optical axis with different trajectories from each other; and
the following conditional expressions being satisfied:

$$0.15 < |fa/f1| < 0.65$$

$$0.15 < |fb/f1| < 2.50$$

where fa denotes a focal length of said first focusing lens group, fb denotes a focal length of said second focusing lens group, and f1 denotes a focal length of said first lens group.

3. A variable magnification optical system according to claim 2, wherein the following conditional expression is satisfied:

$$0.30 < |fa/fb| < 0.90$$

where fa denotes a focal length of said first focusing lens group, and fb denotes a focal length of said second focusing lens group.

4. A variable magnification optical system according to claim 1, further comprising at least one intermediate lens group having negative refractive power between said first lens group and said first focusing lens group.

5. A variable magnification optical system according to claim 1, wherein at least one of said first focusing lens group and said second focusing lens group has positive refractive power, and said rear lens group has negative refractive power.

6. A variable magnification optical system according to claim 1, wherein a lens arranged at a most object side in said first focusing lens group is arranged at an image side of an aperture stop.

7. A variable magnification optical system according to claim 1, wherein upon focusing from an infinite distance object to a close distance object, said first focusing lens group is moved toward the image side and said second focusing lens group is moved toward the object side.

8. A variable magnification optical system according to claim 4, wherein at least a part of said intermediate lens group is moved to have a component in a direction perpendicular to the optical axis.

9. A variable magnification optical system according to claim 1, wherein the following conditional expression is satisfied:

$$0.20 < |fa|/(-fr) < 1.00$$

where fr denotes a focal length of a most object side lens group in said rear lens group.

10. A variable magnification optical system according to claim 1, wherein said first focusing lens group consists of two positive lenses and one negative lens.

11. A variable magnification optical system according to claim 1, wherein the following conditional expression is satisfied:

$$0.50 < Xat/D3a < 3.00$$

where Xat denotes a distance which said first focusing lens group moves upon focusing from an infinite distance object to a close distance object in a telephoto end state, and D3a denotes a distance from a most object side lens surface of the first focusing lens group to a most image side lens surface of the first focusing lens group.

12. An optical apparatus equipped with a variable magnification optical system according to claim 1.

13. A method for manufacturing a variable magnification optical system comprising: in order from an object side, a first lens group, a first focusing lens group disposed at an image side of the first lens group, a second focusing lens group disposed at an image side of the first focusing lens group, and a rear lens group disposed at an image side of the second focusing lens group;
the method comprising the steps of:
constructing such that, upon varying magnification, the first lens group is moved, and an interval between said first lens group and said first focusing lens group, an interval between said first focusing lens group and said second focusing lens group and an interval between said second focusing lens group and said rear lens group are varied;
constructing such that, upon focusing, said first focusing lens group and said second focusing lens group are moved along the optical axis with different trajectories from each other;
constructing such that a shooting magnification in any focal length state is equal to or exceeds −0.5, and
constructing such that the following conditional expression is satisfied:

$$0.30 < |fa/fb| < 0.90$$

where fa denotes a focal length of said first focusing lens group, and fb denotes a focal length of said second focusing lens group.

14. A method for manufacturing a variable magnification optical system comprising: in order from an object side, a first lens group, an intermediate lens group having negative refractive power, a first focusing lens group having positive refractive power, a second focusing lens group having positive refractive power and a rear lens group having negative refractive power;

the method comprising the steps of:

constructing such that, upon varying magnification from a wide angle end state to a telephoto end state, the first lens group is moved, and an interval between said first lens group and said intermediate lens group, an interval between said intermediate lens group and said first focusing lens group, an interval between said first focusing lens group and said second focusing lens group and an interval between said second focusing lens group and said rear lens group are varied;

constructing such that, upon focusing from an infinite distance object to a close distance object, said first focusing lens group and said second focusing lens group are moved along the optical axis with different trajectories from each other;

construction such that a shooting magnification in any focal length stats is equal to or exceeds −0.5, and constructing such that the following conditional expressions are satisfied:

$0.15 < |fa|/f1 < 0.65$ $0.15 < |fb|/f1 < 2.50$ where fa denotes a focal length of said first focusing lens group, fb denotes a focal length of said second focusing lens group, and f1 denotes a focal length of said first lens group.

15. A variable magnification optical system according to claim 1, wherein a shooting magnification in any focal length state is equal to or exceeds −0.5.

16. A variable magnification optical system according to claim 2, further comprising at least one intermediate lens group having negative refractive power between said first lens group and said first focusing lens group.

17. A variable magnification optical system according to claim 2, wherein at least one of said first focusing lens group and said second focusing lens group has positive refractive power, and said rear lens group has negative refractive power.

18. A variable magnification optical system according to claim 2, wherein a lens arranged at a most object side in said first focusing lens group is arranged at an image side of an aperture stop.

19. A variable magnification optical system according to claim 2, wherein upon focusing from an infinite distance object to a close distance object, said first focusing lens group is moved toward the image side and said second focusing lens group is moved toward the object side.

20. A variable magnification optical system according to claim 16, wherein at least a part of said intermediate lens group is moved to have a component in a direction perpendicular to the optical axis.

21. A variable magnification optical system according to claim 2, wherein the following conditional expression is satisfied:

$0.20 < |fa|/(-fr) < 1.00$ where fr denotes a focal length of a most object side lens group in said rear lens group.

22. A variable magnification optical system according to claim 2, wherein said first focusing lens group consists of two positive lenses and one negative lens.

23. A variable magnification optical system according to claim 2, wherein the following conditional expression is satisfied:

$0.50 < Xat/D3a < 3.00$ where Xat denotes a distance which said first focusing lens group moves upon focusing from an infinite distance object to a close distance object in a telephoto end state, and D3a denotes a distance from a most object side lens surface of the first focusing lens group to a most image side lens surface of the first focusing lens group.

24. An optical apparatus equipped with a variable magnification optical system according to claim 2.

25. A variable magnification optical system according to claim 2, wherein a shooting magnification in any focal length state is equal to or exceeds −0.5.

26. A variable magnification optical system according to claim 3, further comprising at least one intermediate lens group having negative refractive power between said first lens group and said first focusing lens group.

27. A variable magnification optical system according to claim 3, wherein at least one of said first focusing lens group and said second focusing lens group has positive refractive power, and said rear lens group has negative refractive power.

28. A variable magnification optical system according to claim 3, wherein a lens arranged at a most object side in said first focusing lens group is arranged at an image side of an aperture stop.

29. A variable magnification optical system according to claim 3, wherein upon focusing from an infinite distance object to a close distance object, said first focusing lens group is moved toward the image side and said second focusing lens group is moved toward the object side.

30. A variable magnification optical system according to claim 26, wherein at least a part of said intermediate lens group is moved to have a component in a direction perpendicular to the optical axis.

31. A variable magnification optical system according to claim 3, wherein the following conditional expression is satisfied:

$0.20 < |fa|/(-fr) < 1.00$ where fr denotes a focal length of a most object side lens group in said rear lens group.

32. A variable magnification optical system according to claim 3, wherein said first focusing lens group consists of two positive lenses and one negative lens.

33. A variable magnification optical system according to claim 3, wherein the following conditional expression is satisfied:

$0.50 < Xat/D3a < 3.00$ where Xat denotes a distance which said first focusing lens group moves upon focusing from an infinite distance object to a close distance object in a telephoto end state, and D3a denotes a distance from a most object side lens surface of the first focusing lens group to a most image side lens surface of the first focusing lens group.

34. An optical apparatus equipped with a variable magnification optical system according to claim 3.

35. A variable magnification optical system according to claim 3, wherein a shooting magnification in any focal length state is equal to or exceeds −0.5.

* * * * *